(12) United States Patent
Koizumi

(10) Patent No.: US 6,203,216 B1
(45) Date of Patent: Mar. 20, 2001

(54) COMPACT LOW-PROFILE CAMERA DEVICE

(75) Inventor: Shigeki Koizumi, Saitama-ken (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 08/976,335

(22) Filed: Nov. 21, 1997

(30) Foreign Application Priority Data

Nov. 29, 1996 (JP) .................................................. 8-320586
Nov. 29, 1996 (JP) .................................................. 8-320587
Nov. 29, 1996 (JP) .................................................. 8-320588

(51) Int. Cl.[7] .................................................. G03B 17/00
(52) U.S. Cl. .......................... 396/427; 396/428; 348/143; 348/158
(58) Field of Search .................................... 348/143, 158; 396/419, 427, 428

(56) References Cited

U.S. PATENT DOCUMENTS 3,568,583 * 3/1971 Horberg, Jr. et al. ................ 396/427
4,736,218 * 4/1988 Kutman ................................. 396/427
5,224,675 * 7/1993 Ellenberger et al. ................. 396/427

* cited by examiner

Primary Examiner—David M. Gray
(74) Attorney, Agent, or Firm—Morgan & Finnegan LLP

(57) ABSTRACT

In a panhead device (1) which supports an image sensing apparatus (100) on a panhead (2) and pivots the image sensing apparatus (100) in the pan or tilt direction, a pan pivot shaft (43) stands upright on a base (49) of the device, and a tilt pivot shaft (25) is horizontally disposed above that shaft. The shaft (25) is disposed to be offset in front of the shaft (43). Principal constituting members of a tilting mechanism are disposed behind the shaft (25).

20 Claims, 26 Drawing Sheets

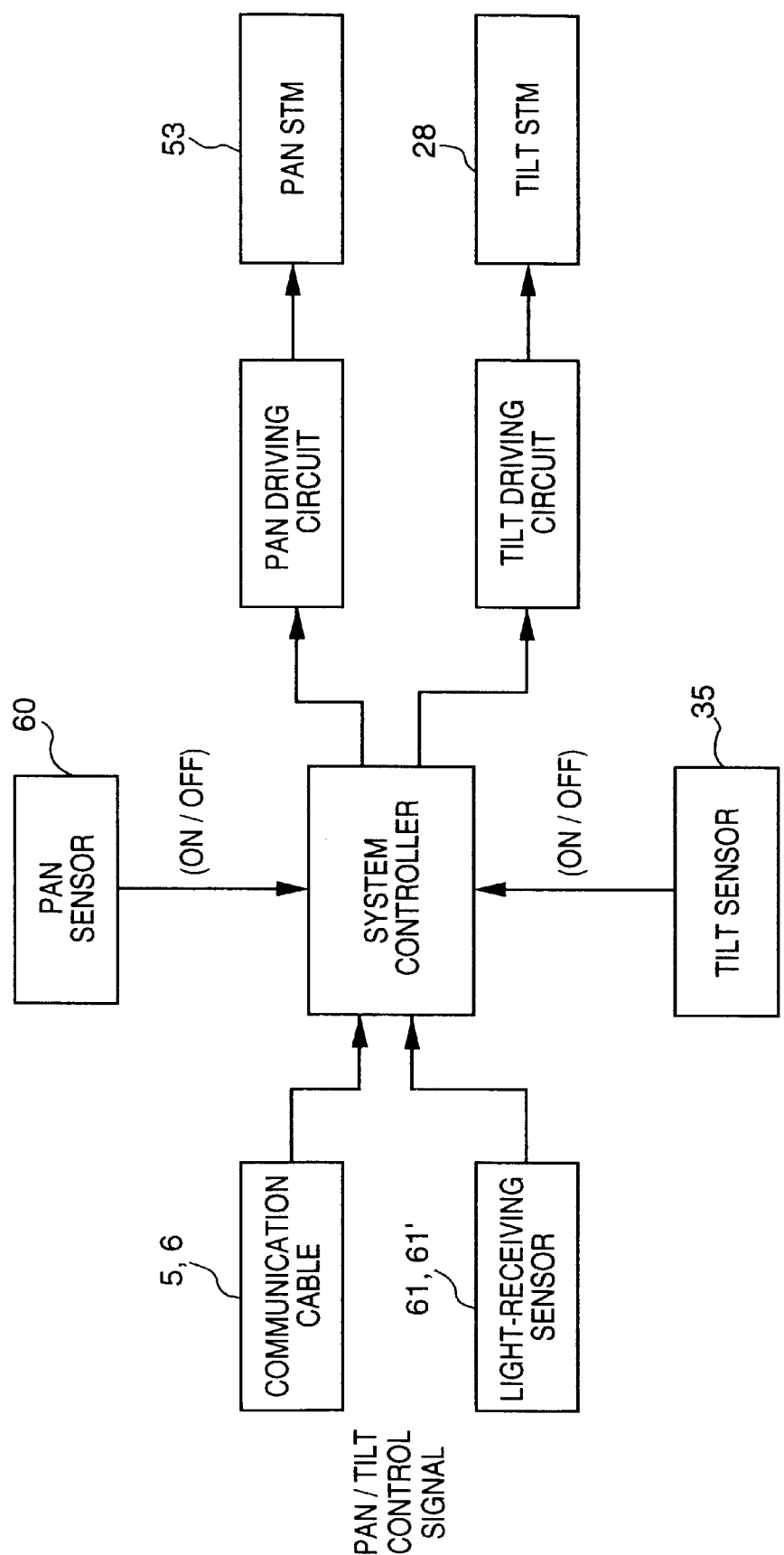

COMPACT LOW-PROFILE CAMERA DEVICE

BACKGROUND OF THE INVENTION

The present invention relates to a panhead device which supports an image sensing apparatus such as a video camera, or the like, and pivots the image sensing apparatus in the pan or tilt direction.

In recent years, along with development of communication systems using the Internet, personal computers, and the like, so-called video conference systems have become popular. In such communication system, e.g., in a video conference system, an image is captured using a video camera, and data including information of the captured image can be communicated with each other.

Conventionally, when an image is captured by a video camera, and that video information is transmitted, a panhead device which supports the video camera and pivots it in the pan or tilt direction is known. However, the conventional panhead device has only a simple function that merely allows panning or tilting, and is not easy to control integrally with the video camera.

The conventional panhead device normally has a large outer shape, and is not easy to carry and operate. Furthermore, mechanical cluttering or the like of a lower transmission mechanism of a pan or tilt system in the panhead device often disturbs smooth operation.

Furthermore, since the number of parts that build the device is large in correspondence with the large outer shape, a large number of steps are required to assemble the device itself. When a cable including signal lines for, e.g., a control signal and the like is mounted on the device, the layout of the cable is troublesome, and some cable used may restrain the operation of the panhead device itself.

In the conventional panhead device, since it is not easy to detect the home positions of the pan and tilt mechanisms, it is not easy to return the device to those home positions within a short period of time.

SUMMARY OF THE INVENTION

The present invention has been made in consideration of the above situation, and has as its object to provide a compact panhead device with high operation performance, which has a structure that allows easy assembly.

In order to achieve the above object, a panhead device according to the present invention is characterized by having the following arrangement.

That is, a panhead device which supports an image sensing apparatus on a panhead, and pivots the image sensing apparatus in a pan or tilt direction, comprises a tilt mechanism for tilting the panhead about a tilt pivot shaft and a pan mechanism for panning the tilt mechanism about a pan pivot shaft, and the tilt and pan mechanisms are disposed to be offset from each other in a back-and-forth direction of the panhead device.

For example, preferably, the pan pivot shaft stands upright on a base of the panhead device, and the tilt pivot shaft is horizontally disposed above the pan pivot shaft.

Also, the tilt pivot shaft is preferably disposed in front of the pan pivot shaft.

In a panhead device which supports an image sensing apparatus on a panhead, and pivots the image sensing apparatus in a pan or tilt direction, each of driving force transmission systems for respectively panning and tilting the panhead comprises power transmission means having a worm and worm wheel, and the worm is supported to be freely movable in a radial direction of the worm wheel and is biased in the radial direction.

For example, means for biasing the worm preferably comprises at least a leaf spring which elastically contacts the worm in a thrust direction thereof.

In a panhead device which supports an image sensing apparatus on a panhead, and pivots the image sensing apparatus in a pan or tilt direction, the panhead and a bearing cover that fixes the tilt pivot shaft can be assembled from an upper side with respect to the base of the tilt mechanism, and the panhead is fixed to and supported on the base of the tilt mechanism when the bearing cover is assembled.

For example, preferably, the bearing cover has a lock arm that can engage with a predetermined position of the base, and engages with and is held by the base by clamping the predetermined position with the lock arm.

A In a panhead device which supports an image sensing apparatus on a panhead, and pivots the image sensing apparatus in a pan or tilt direction, the panhead is supported to be pivotal about the tilt pivot shaft, and a communication cable is mounted in a space formed inside the panhead, and the communication cable is preferably mounted along a curved wall surface formed inside the panhead.

A panhead device which supports an image sensing apparatus on a panhead, and pivots the image sensing apparatus in a pan or tilt direction, comprises detection means for detecting a home position in panning or tilting of the panhead, and the detection means outputs a first predetermined signal when the panhead is located within an operation range on one side of a reference position of panning or tilting of the panhead, and outputs a second predetermined signal when the panhead is located within an operation range on the other side of the reference position.

Preferably, the detection means comprises:
a pivot member which synchronously pivots about an axis coaxial with a central axis of the panning or tilting, and a sensor for outputting the first or second predetermined signal, and the state of an output signal from the sensor is changed by the pivot member.

More preferably, the pivot member and the sensor are disposed, so that the state of the output signal from the sensor changes when the panhead is located at a home position in panning or tilting.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 31 is a schematic block diagram showing the arrangement of a driving control system of the panhead device according to the embodiment of the present invention.

DETAILED DESCRIPTION OF THE PREFERRED EMBODIMENT

Figure 1:
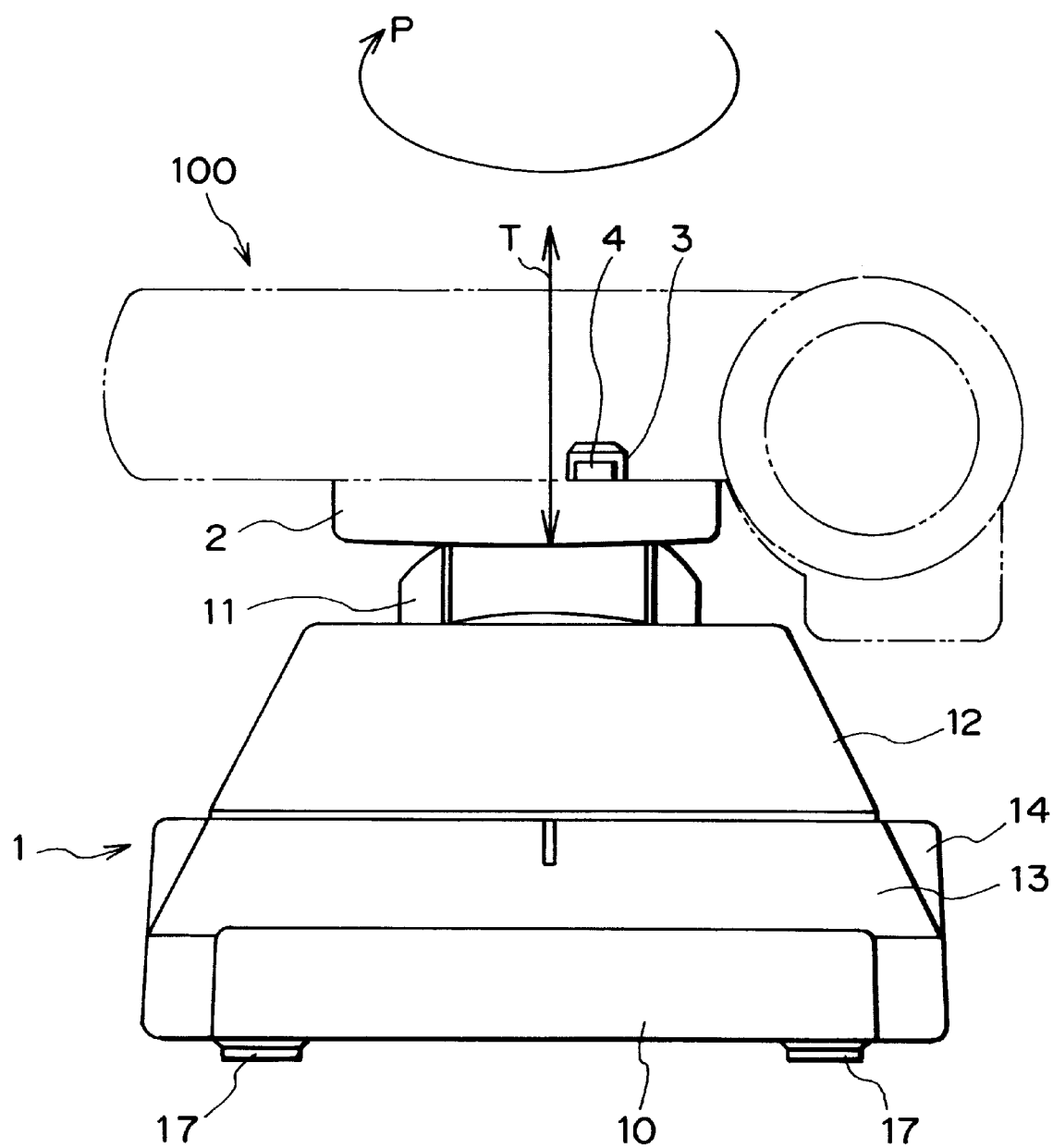
FIG. 1 is a front view showing the outer arrangement of a panhead device according to an embodiment of the present invention.
Figure 2:
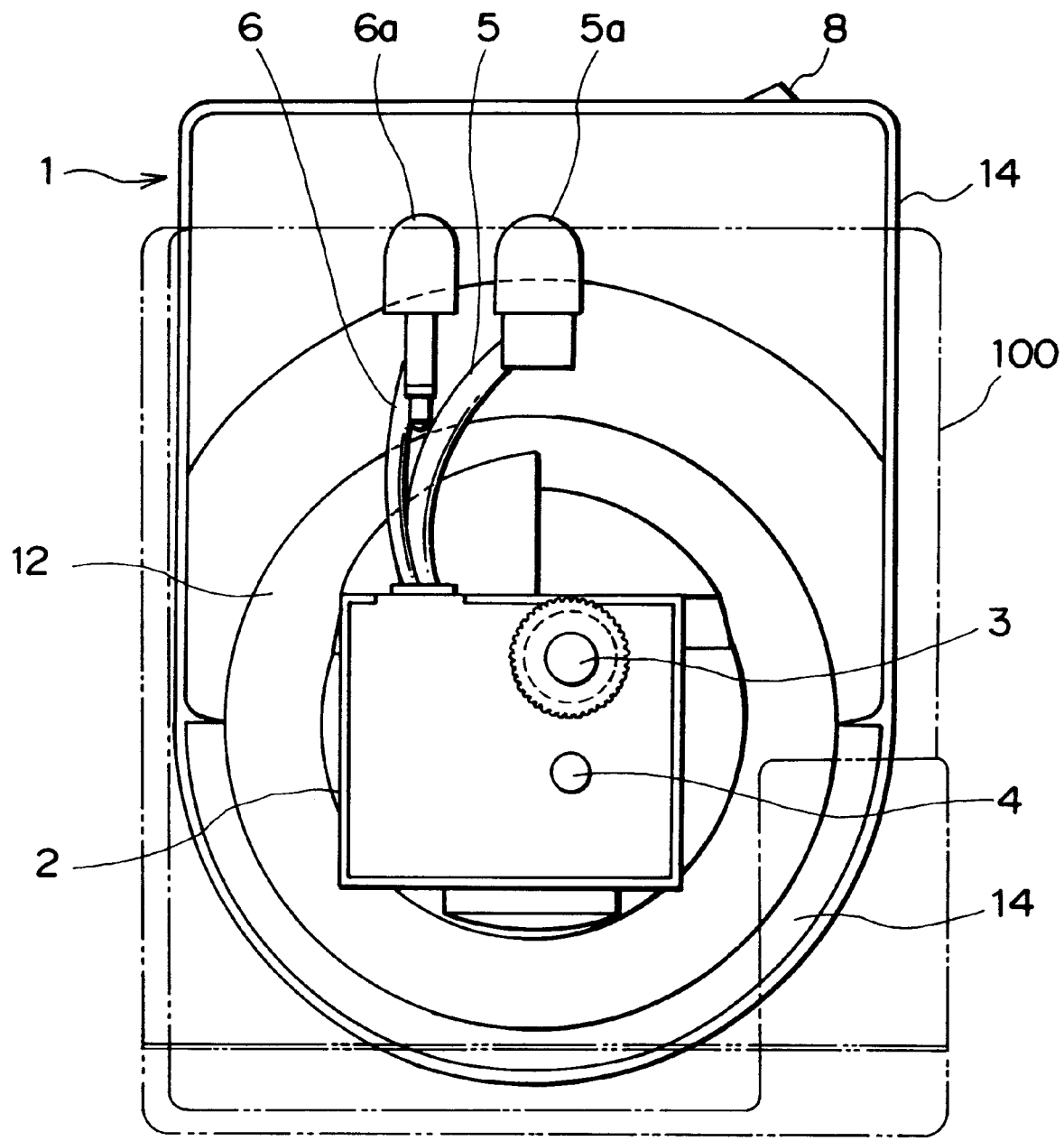
FIG. 2 is a top view showing the outer arrangement of the panhead device according to the embodiment of the present invention.
Figure 3:
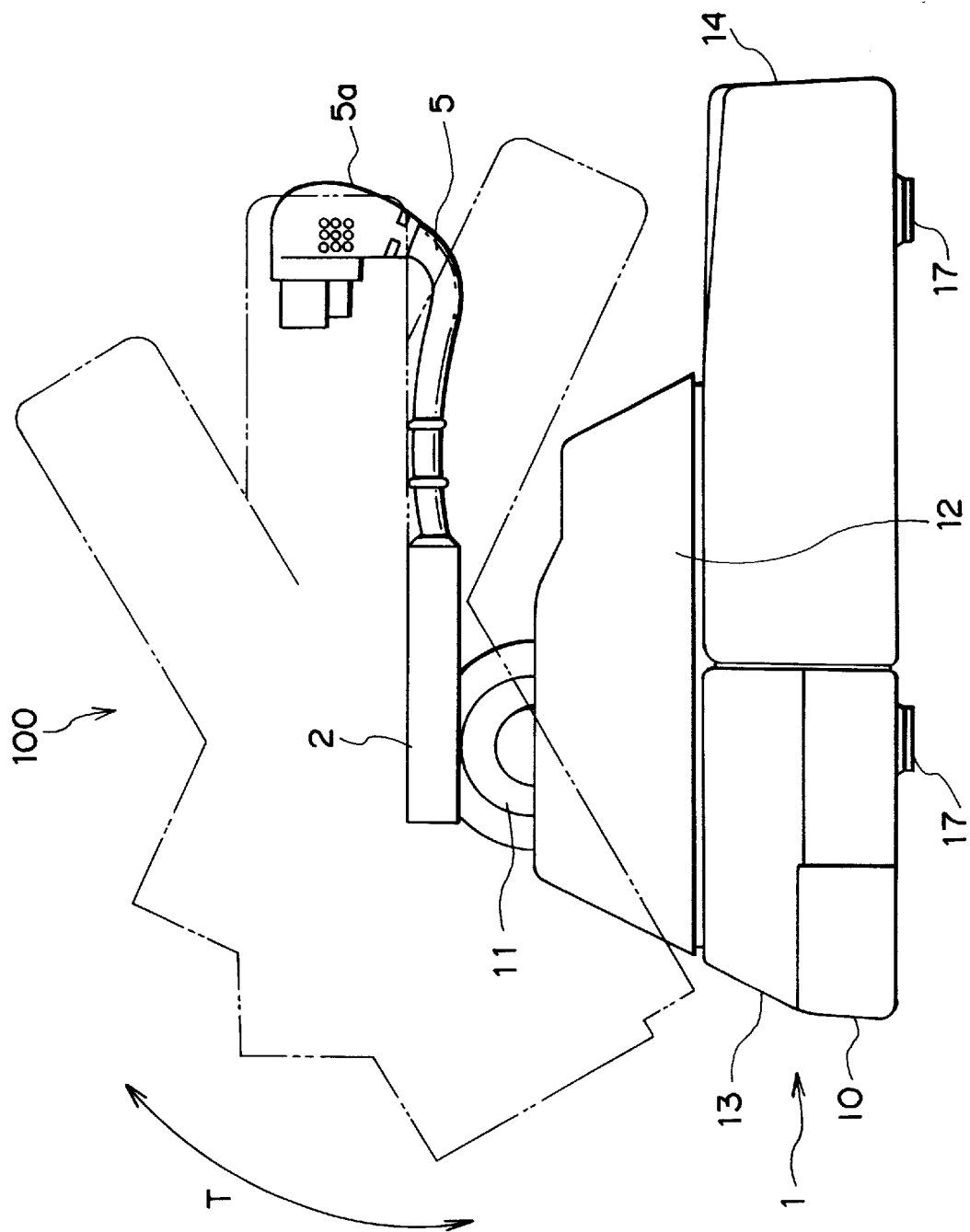
FIG. 3 is a left side view showing the outer arrangement of the panhead device according to the embodiment of the present invention.
Figure 4:
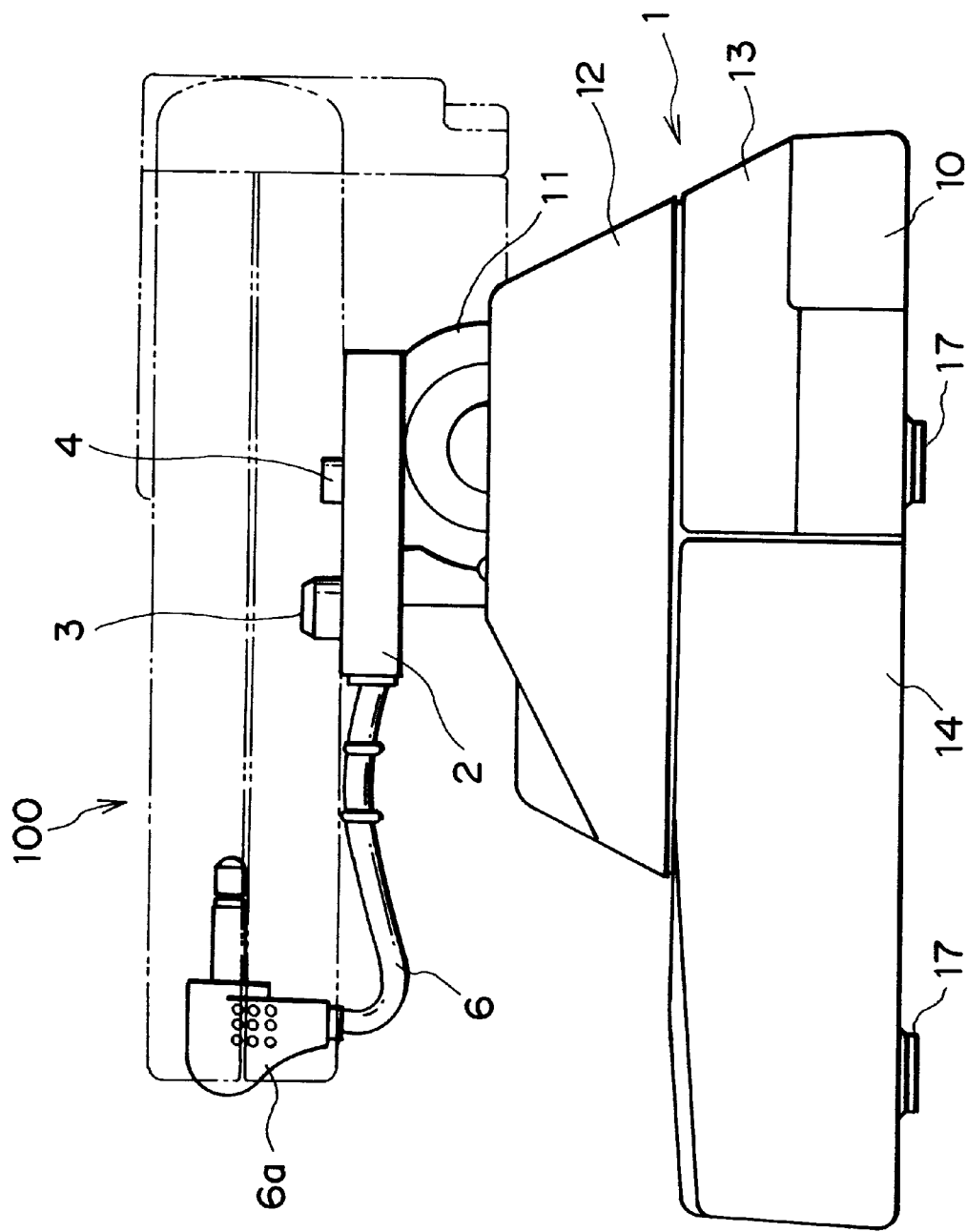
FIG. 4 is a right side view showing the outer arrangement of the panhead device according to the embodiment of the present invention.

The preferred embodiment of a panhead device according to the present invention will be described in detail hereinafter with reference to the accompanying drawings.

FIGS. 1 to 6 show the outer arrangement of a panhead device 1 and a video camera 100 mounted on the device 1 in this embodiment.

The video camera 100 may be an image sensing apparatus such as a CCD (charge coupled device) video camera, or the like. The panhead device 1 can support the video camera 100 on a panhead 2, and can pivot it in a pan direction (horizontal direction) P or tilt direction (vertical direction) T, as will be described later.

The video camera 100 on the panhead 2 is aligned and fixed at a predetermined position by a camera screw 3 (male) and a camera fixing pin 4. The camera fixing pin 4 is biased by a spring (not shown) arranged inside the panhead 2 to protrude.

Figure 5:
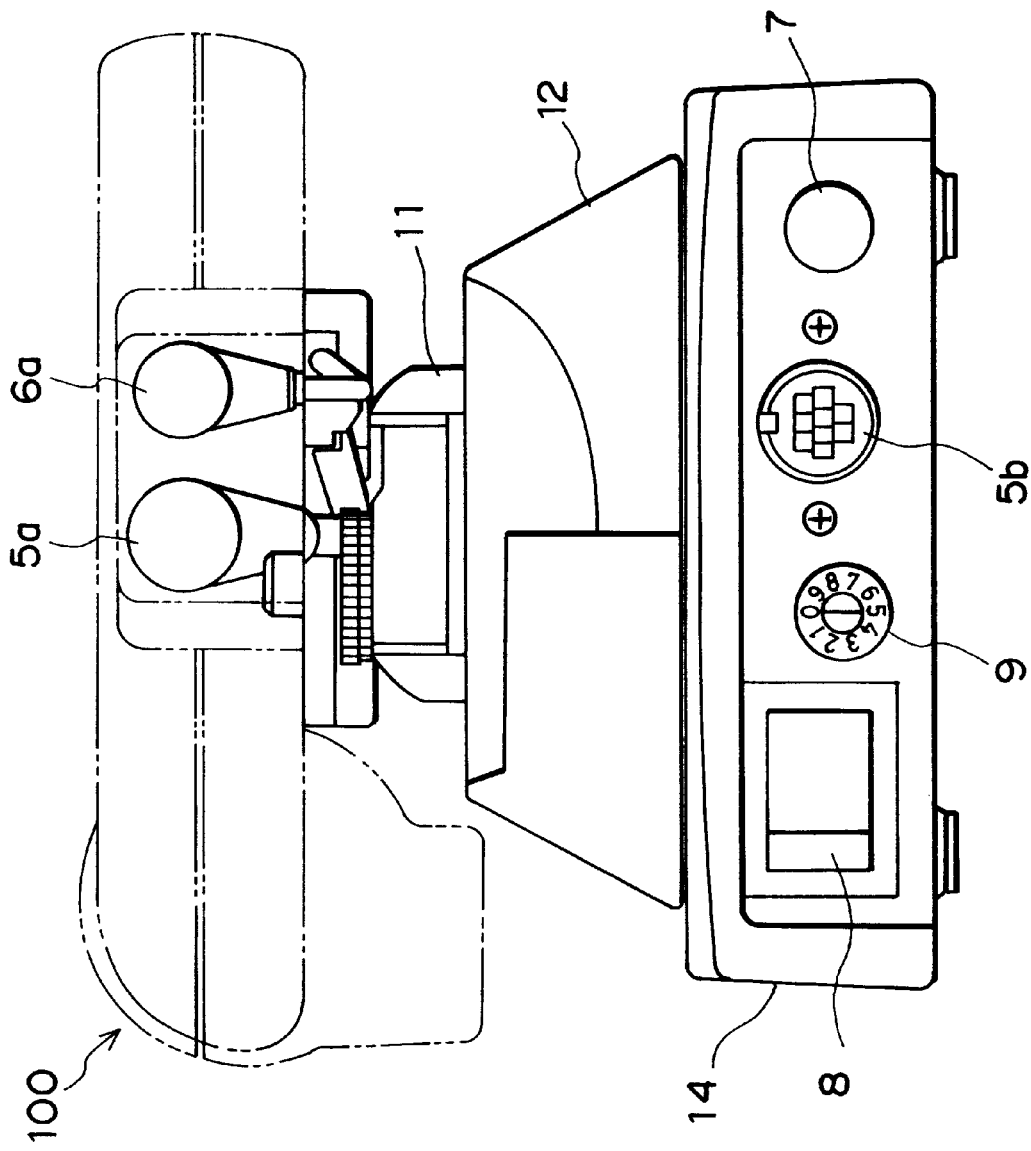
FIG. 5 is a rear view showing the outer arrangement of the panhead device according to the embodiment of the present invention.

Communications between the video camera 100 and an external device are done via a communication cable 5. By inserting a plug 5a of the communication cable 5 into a plug (not shown) of the camera 100, the camera 100 is connected to a socket 5b (FIG. 5) via an inner cable of the panhead device 1. With this connection, the video camera 100 can communicate with an external device via the socket 5b. Communications between the panhead device 1 and the video camera 100 are done via a communication cable 6. By inserting a plug 6a of the communication cable 6 into a plug (not shown) of the camera 100, the camera 100 is coupled to a connector (not shown) of the panhead device 1. A power supply voltage of the panhead device 1 is supplied from a DC input plug 7 (FIG. 5), and can be turned on/off by a power switch 8. In FIG. 5, reference numeral 9 denotes an ID select switch for setting the identification number (ID) of the panhead device 1.

Communications to the panhead device 1 are basically done via the communication cable 6 from the video camera 100. Note that communications may also be done via infrared ray signals using a remote control unit (not shown). In this case, two light-receiving sensors (to be described later) are preferably disposed inside an acrylic light-receiving cover 10 so as to cover the movable range of the video camera 100.

Figure 6:
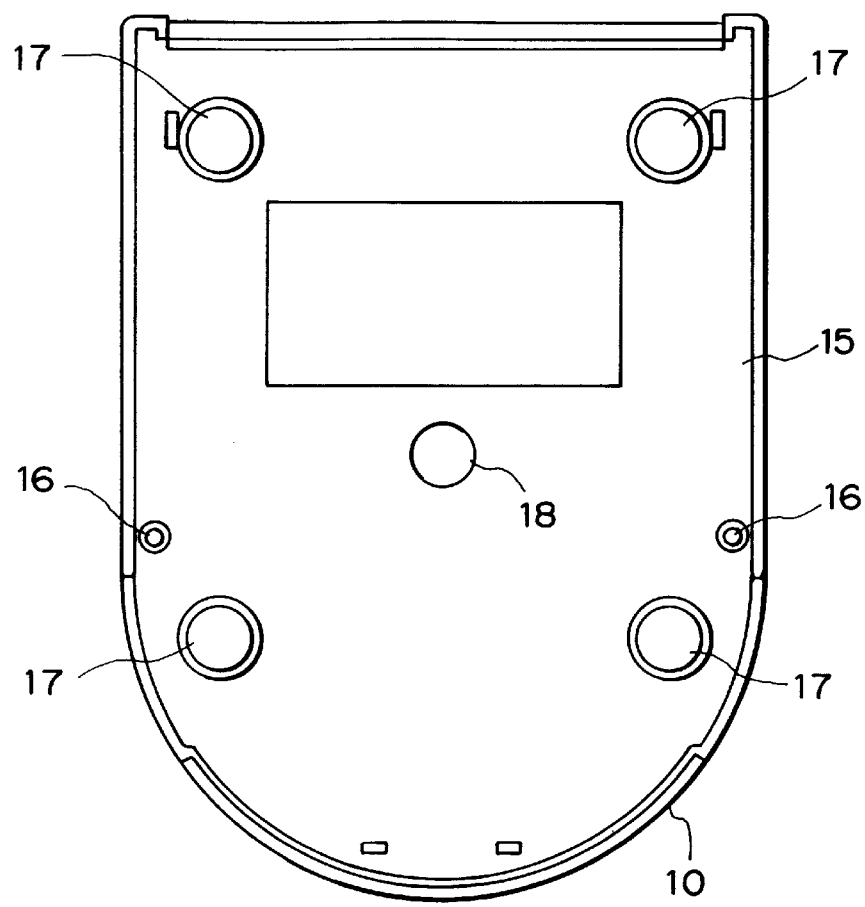
FIG. 6 is a bottom view showing the outer arrangement of the panhead device according to the embodiment of the present invention.

In FIG. 1, reference numeral 11 denotes a bearing cover for fixing this panhead unit to an upper cover 12. The bearing cover 11 builds a bearing unit for supporting a shaft as the pivot center in the tilt direction T. Inside the upper cover 12, a tilting mechanism (to be described later) is held, and the portion above the upper cover 12 is pivotal in the pan direction P. Reference numeral 13 denotes a front cover; and 14, a rear cover. These covers make up the exterior of the overall device together with a bottom cover 15. These covers are fixed by two set screws 16 from the bottom cover 15 side (FIG. 6). In FIG. 6, reference numeral 17 denotes rubber legs; and 18, a camera screw. The panhead device 1 may be set on a proper base, table, or the like at the rubber legs 17, or may be fixed to a tripod or the like using the camera screw 18 (female) while mounting the video camera 100.

In the above-mentioned arrangement, when the plug 5a of the communication cable 5 is inserted into the plug (not shown) of the video camera 100 and an external communication plug (not shown) is connected to the socket 5b of the panhead device 1, the camera 100 can be controlled.

Figure 7:
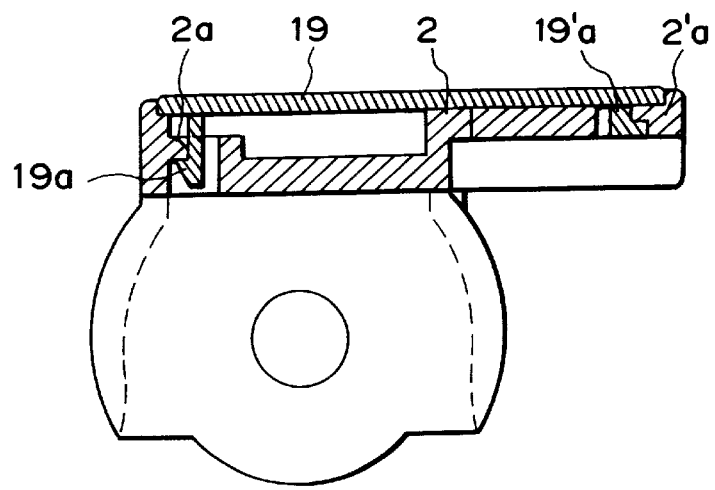
FIG. 7 is a view showing the structure around a panhead unit in the panhead device according to the embodiment of the present invention.

FIG. 7 shows the structure around the panhead unit.

An upper lid 19 is fitted in the panhead 2 to close it. In this case, when lock arms 19a and 19a' of the upper lid 19 engage with lock portions 2a and 2a' of the panhead 2, the upper lid 19 is fitted in and fixed to the panhead 2. As will be described later, the cables 5 and 6 extend through a portion between the panhead 2 and the upper lid 19 fitted in it and are fixed.

FIGS. 8 to 12 show the structure around the tilting mechanism.

A worm wheel 20 is pivotally disposed via a worm wheel shaft 21 inside the panhead 2. A worm wheel spring 22 is formed into a wave washer shape, and is inserted between the worm wheel 20 and worm wheel shaft 21. A friction plate 23 is inserted between the worm wheel 20 and panhead 2, thus making up a friction clutch by a pressing force based on the elastic force of the worm wheel spring 22. The frictional force of the friction clutch does not slip in a normal driving state, but slips when a predetermined external pressure acts on the video camera 100 and the like. Hence, a worm (to be described later) that meshes with the worm wheel 22 never deforms. The worm wheel shaft 21 is fixed to the panhead 2 via an E ring 24.

Figure 8:
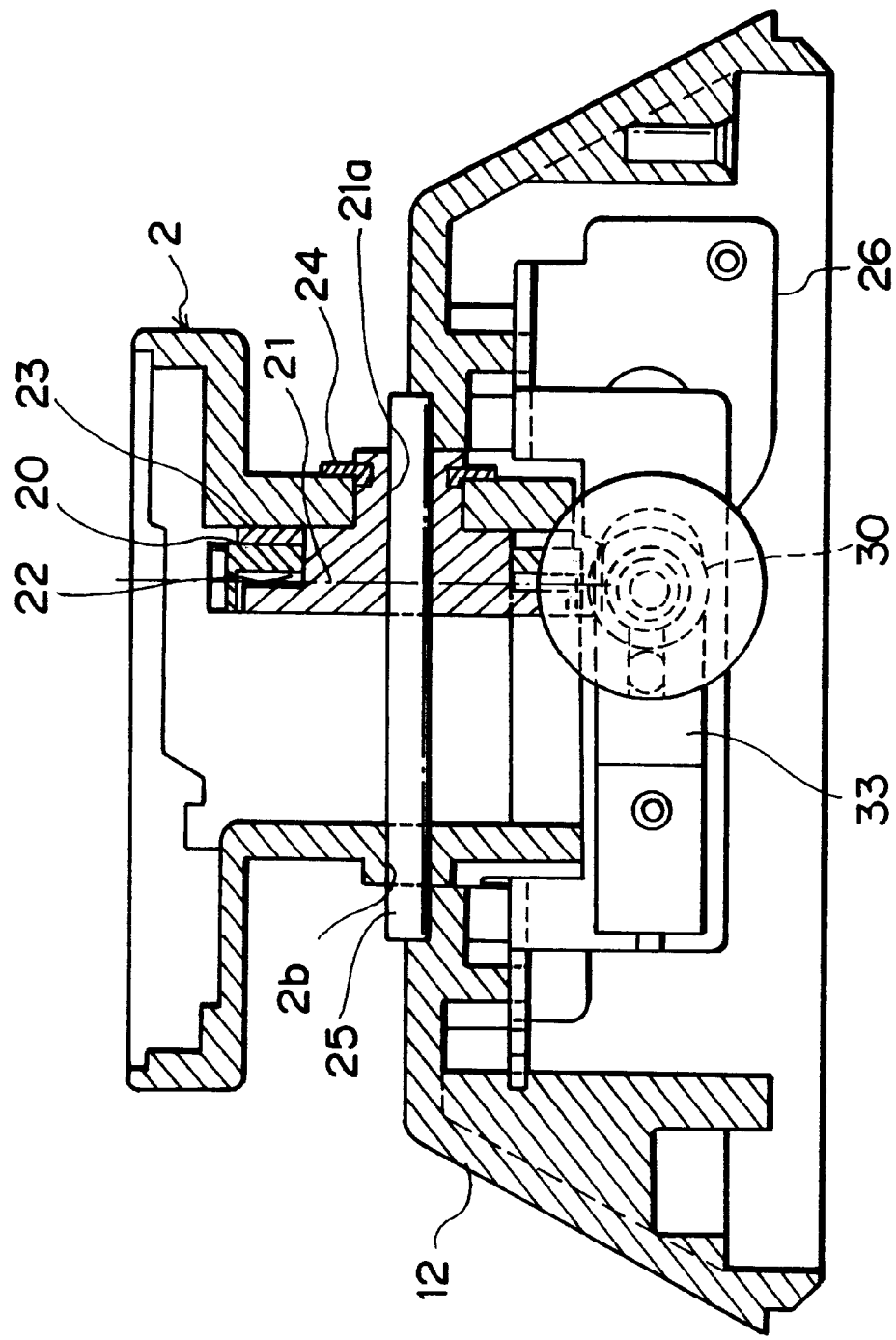
FIG. 8 is a sectional view showing the structure around a tilting mechanism in the panhead device according to the embodiment of the present invention.
Figure 9:
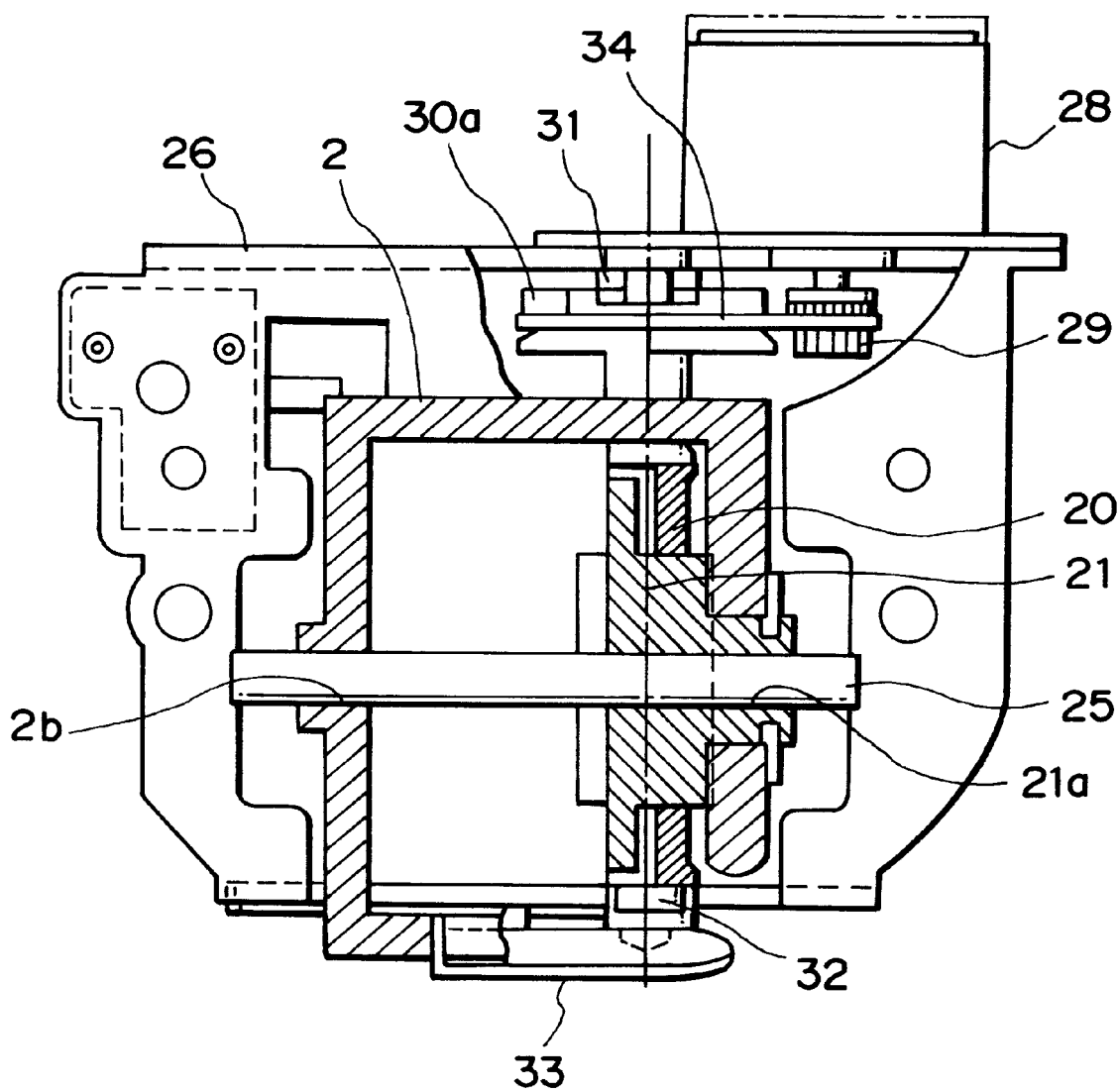
FIG. 9 is a plan view showing the structure around the tilting mechanism in the panhead device according to the embodiment of the present invention.

Reference numeral 25 denotes a shaft serving as the pivot center in the tilt direction T. The shaft 25 is freely fitted in a central hole 21a of the worm wheel shaft 21, and a hole 2b of the panhead 2 formed at a position opposing the central hole 21a (FIGS. 8 and 9). The shaft 25 is fixed to a bearing portion 12a (FIGS. 10 and 11) formed on the upper cover 12 by the bearing cover 11 (FIG. 5), thus pivotally and axially supporting the panhead unit.

Figure 12:
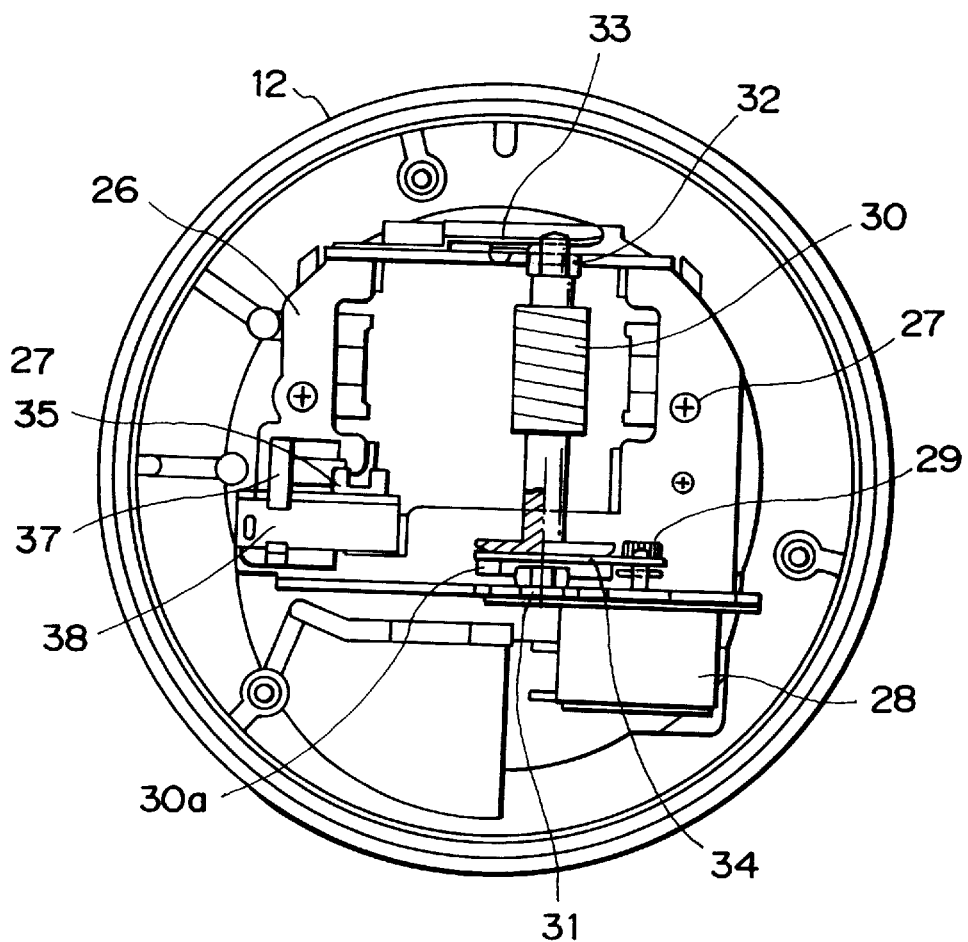
FIG. 12 is a bottom view showing the structure around the tilting mechanism in the panhead device according to the embodiment of the present invention.

Reference numeral 26 denotes a stepping motor (STM) holder, which is fixed to the upper cover 12 by two screws 27, as shown in FIG. 12. The entire tilting mechanism is mounted on the STM holder 26. An STM gear 29 is press-fitted onto the output shaft of a stepping motor 28 supported by the STM holder 26. A worm 30 is inserted into a bearing 31, which is, in turn, inserted into the STM holder 26, and is then inserted into a bearing 32, so as to be rotatably and axially supported between these bearings.

Figure 13:
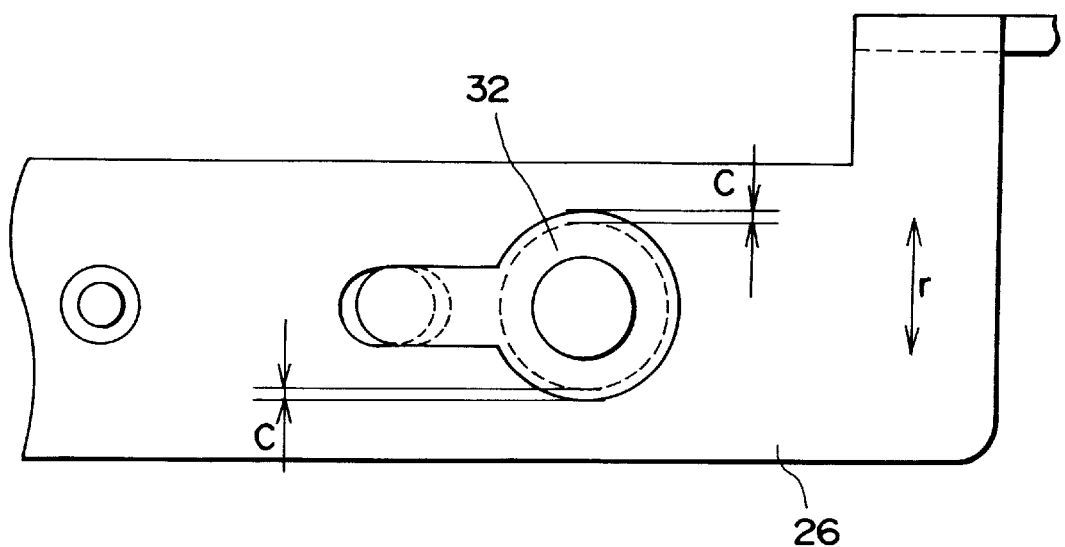
FIG. 13 is a view showing an example of a bearing structure of the tilting mechanism in the panhead device according to the embodiment of the present invention.
Figure 14:
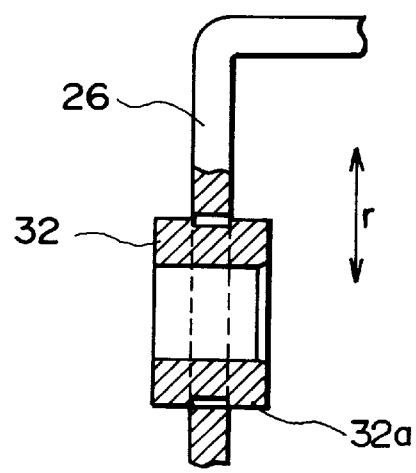
FIG. 14 is a sectional view showing an example of the bearing structure of the tilting mechanism in the panhead device according to the embodiment of the present invention.

A portion 32a of the bearing 32 and the insertion hole of the STM holder 26 are formed into an elliptic shape. Hence, when the bearing 32 is inserted to the middle of the insertion hole and is rotated 90°, it cannot be removed from the insertion hole and is movable in a radial direction r with respect to the worm wheel 20. That is, as shown in FIGS. 13 and 14, a clearance C in the radial direction r is set between the bearing 32 and the insertion hole of the STM holder 26.

Figure 10:
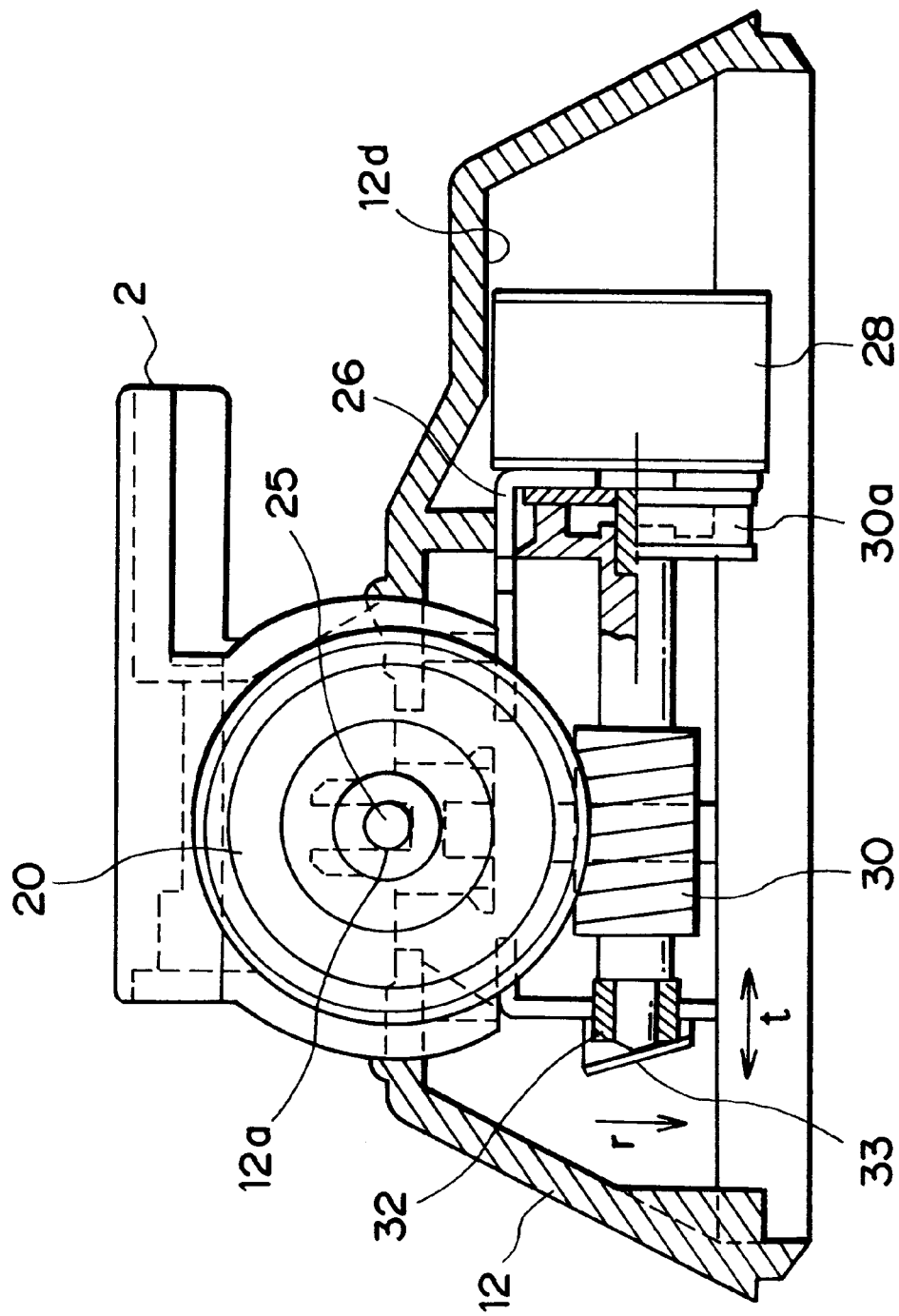
FIG. 10 is a sectional view showing the structure around the tilting mechanism in the panhead device according to the embodiment of the present invention.

Reference numeral 33 denotes a leaf spring for fixing the worm 30. The leaf spring 33 has an appropriate tilt in the radial direction r and a thrust direction t, as shown in FIG. 10. The leaf spring 33 strongly presses the worm 30 in the direction of the bearing 31 by its elastic force and also presses the worm wheel 20 by a force lower than the elastic force, thereby removing cluttering of a gear in the radial and thrust directions r and t between the worm wheel 20 and worm 30. Reference numeral 34 denotes a belt (a toothed belt is preferable) looped between the STM gear 29 and a belt hook portion (a toothed pulley is preferable) 30a of the worm 30. The belt 34 couples the stepping motor 28 and worm 30.

The rotation driving force of the stepping motor 28 is transmitted to the worm 30 via the belt 34 with a reduced speed, and the worm wheel 20 is rotated at a further reduced speed. The gripping force (frictional force) of the friction clutch is set to be sufficiently larger than the moment of inertia of the tilt system including the video camera 100. For this reason, in a normal state, tilting can be done while appropriately moving the panhead 2. At this time, the counterforce acting on the worm 30 is large in the thrust direction t and small in the radial direction r due to the specific arrangement of the worm gear. The elastic force of the above-mentioned worm spring 22 can sufficiently overcome such load weight.

Reference numeral 35 denotes a tilt sensor (FIG. 11), and is constituted by a U-shaped photocoupler, as also shown in FIG. 12. A pair of a light-emitting diode and light-receiving sensor are built in the two side walls of the U-shaped tilt sensor 35, which is turned off when the optical path between the diode and sensor is shielded. In this embodiment, the tilt sensor 35 is turned on/off by a shielding plate 36 added at a proper position of the panhead 2, as shown in FIG. 11.

Note that the tilt sensor 35 is fixed to a sensor holder 37 which is, in turn, fixed at a predetermined position on the STM holder 26, and is fixed by soldering to a printed circuit board (PCB) 38, as shown in FIG. 12. The output signal from the tilt sensor 35 is supplied to a control device (system controller (see FIG. 31)) via a cable (not shown).

Figure 11:
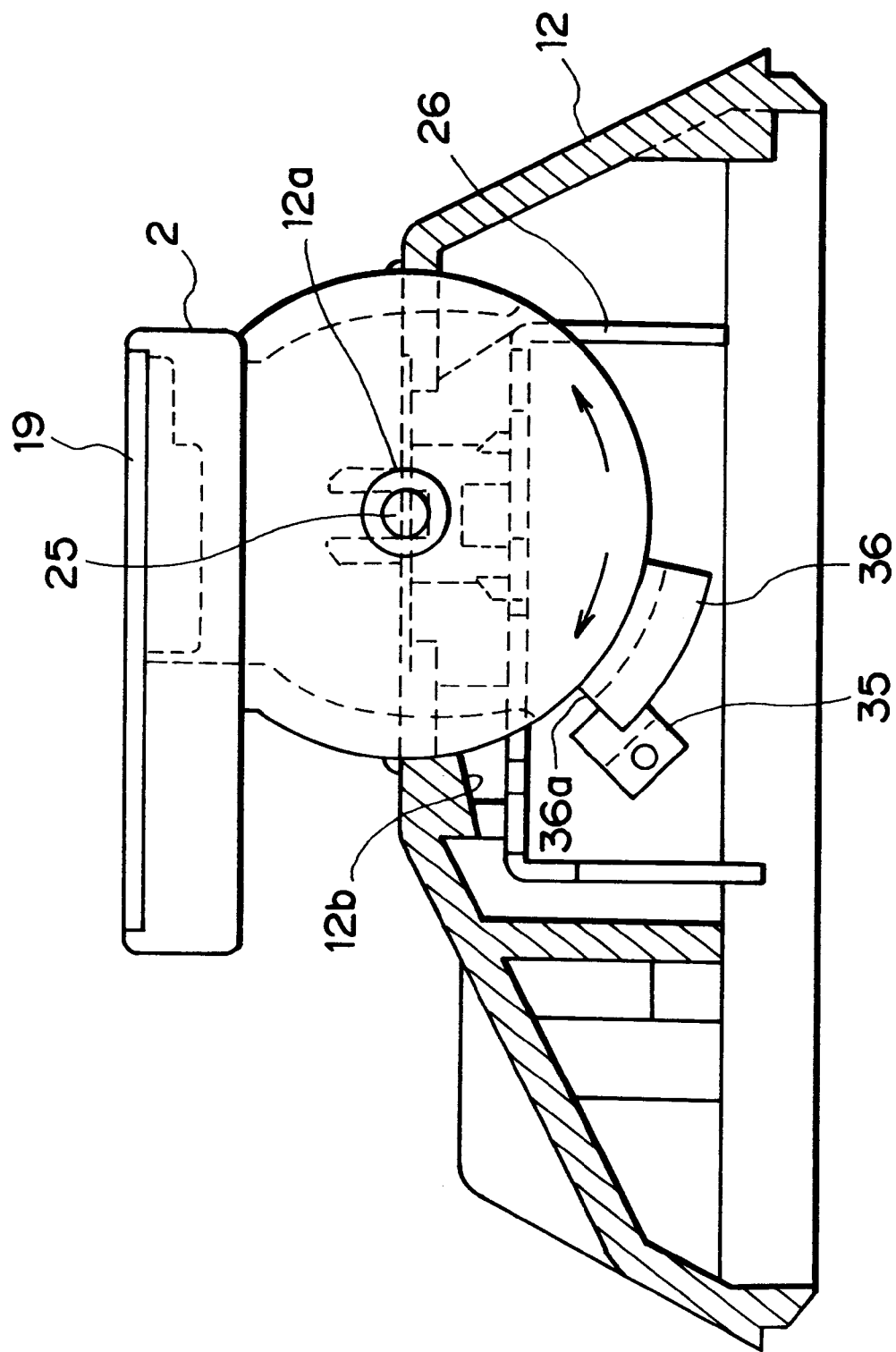
FIG. 11 is a sectional view showing the structure around the tilting mechanism in the panhead device according to the embodiment of the present invention.

In the driving control of the panhead 2, the horizontal state of the panhead 2 shown in FIG. 11 is set as a home position (to be referred to as an HP hereinafter). The shielding plate 36 is formed so that the output from the tilt sensor 35 is kept ON when the panhead 2 is pivoting counterclockwise from the HP in FIG. 11, and it is kept OFF when the panhead 2 is pivoting clockwise from the HP. By setting such layout relationship between the tilt sensor 35 and the shielding plate 36, the direction of the HP can be immediately recognized at the time of turning on the power supply of the panhead device 1, and the panhead 2 can be quickly and smoothly returned to the HP.

In order to avoid hysteresis, when the panhead comes from the reverse side, it once passes the HP, and then returns to the HP.

In the example illustrated in FIG. 11, one end 36a of the shielding plate 36 approaches the optical path of the tilt sensor 35 at the HP of the panhead 2, and the output state of the tilt sensor 35 is about to change from ON to OFF. When the panhead 2 pivots clockwise from this HP (the camera 100 points downward), the output from the tilt sensor 35 is kept OFF during this interval. Furthermore, when the shielding plate 36 contacts a stopper 12b formed inside the upper cover 12, the panhead 2 cannot pivot any more. Conversely, when the panhead 2 pivots counterclockwise from the HP (the camera 100 points upward), the output from the tilt sensor 35 is kept ON during this interval. In this case, the motion of the panhead 2 is restrained since the panhead 2 itself contacts the outer side of the upper cover 12.

Figure 15:
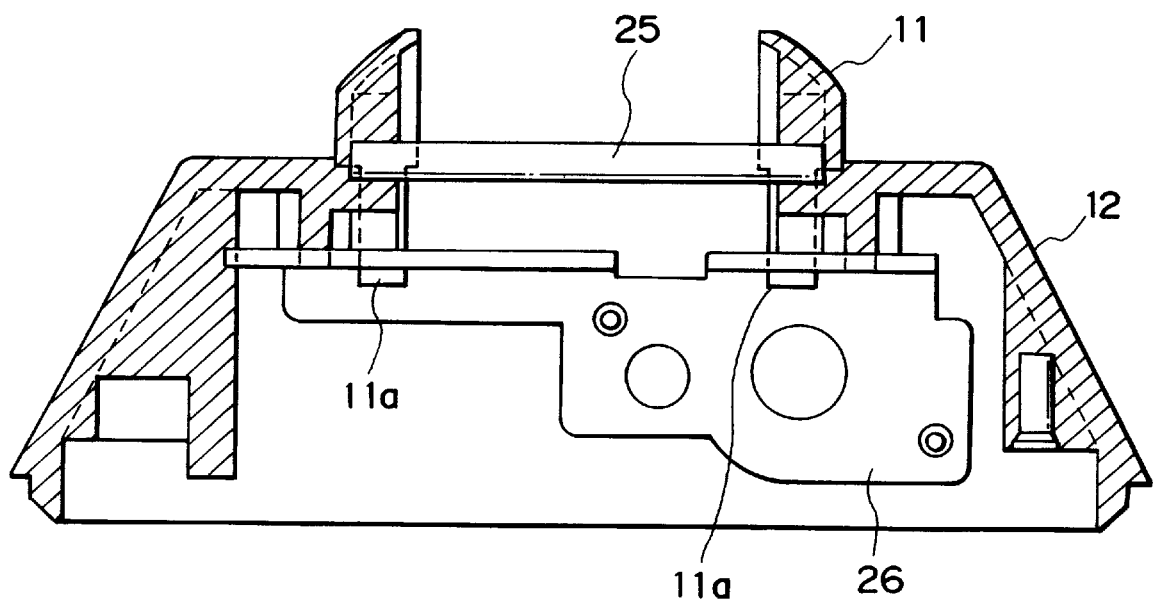
FIG. 15 is a sectional view showing the structure around a bearing cover in the panhead device according to the embodiment of the present invention.
Figure 16:
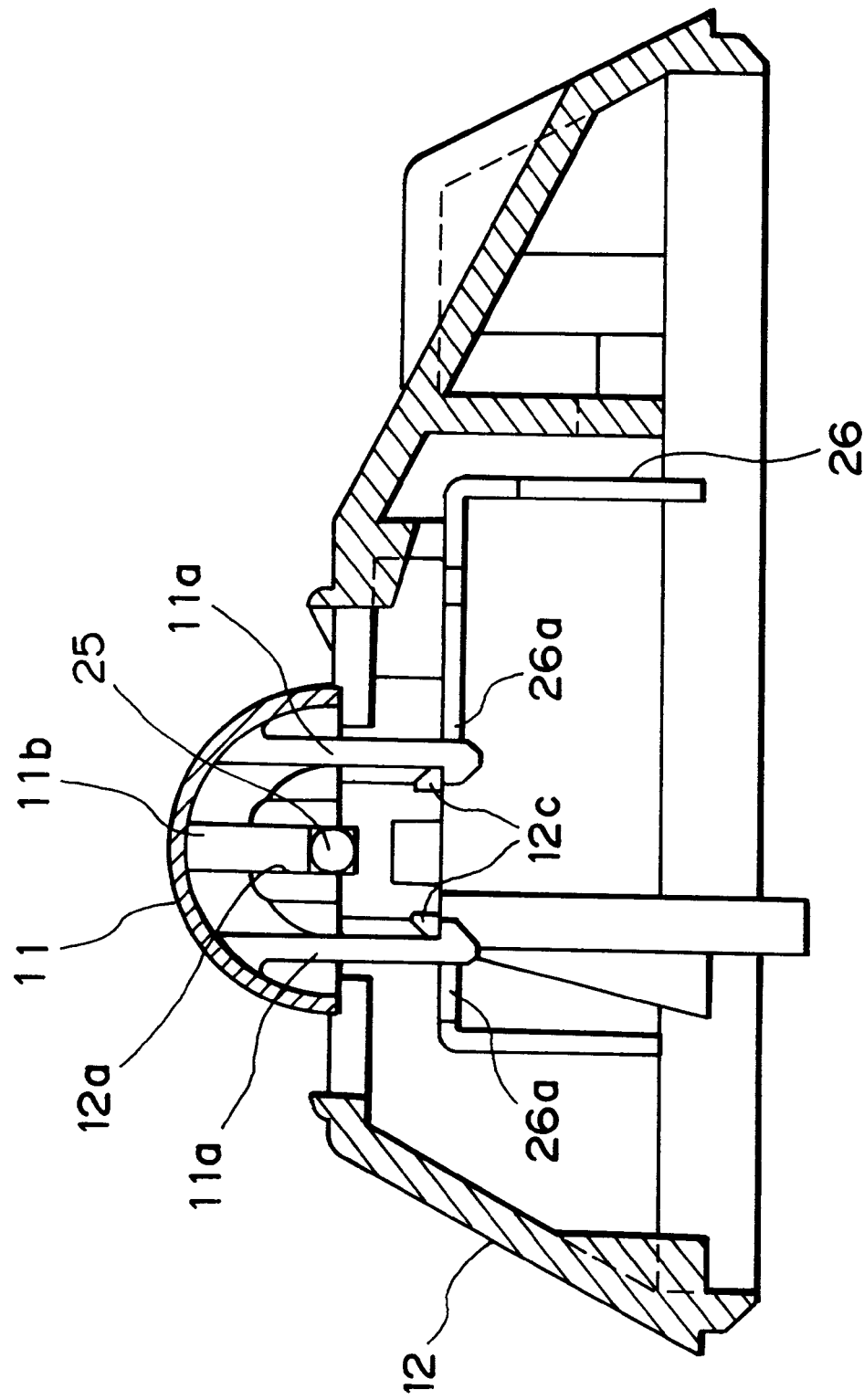
FIG. 16 is a sectional view showing the structure around the bearing cover in the panhead device according to the embodiment of the present invention.
Figure 17:
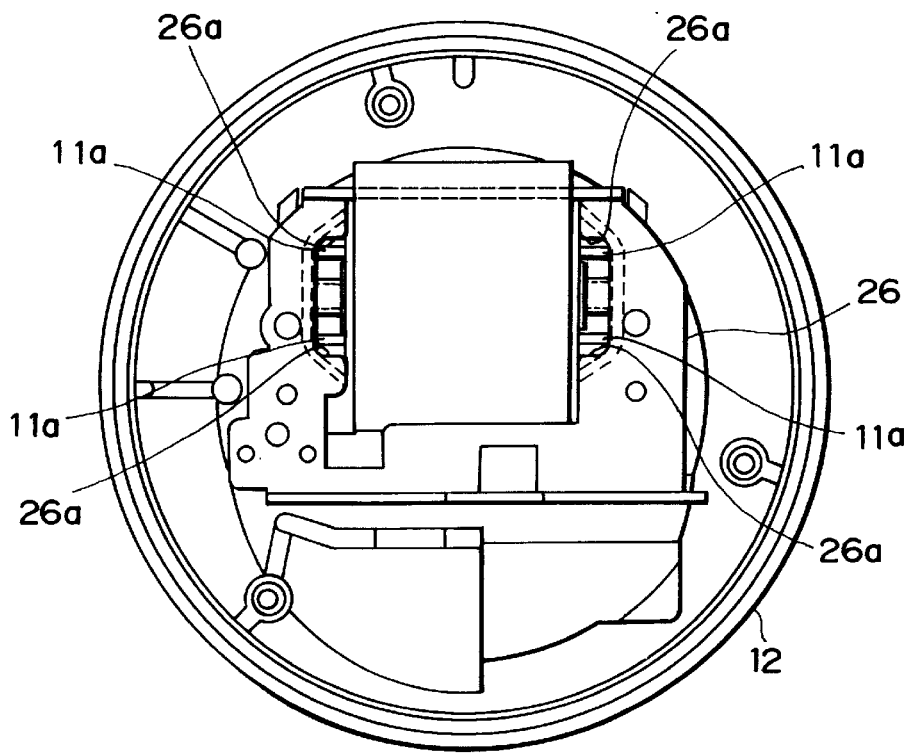
FIG. 17 is a bottom view showing the structure around the bearing cover in the panhead device according to the embodiment of the present invention.

FIGS. 15 to 17 show the structure around the bearing cover 11.

The bearing cover 11 has lock arms 11a which engage with lock portions 12c of the upper cover 12, and a projection 11b which clamps the shaft 25 by pressing it down and is fitted into the bearing portion 12a to position the shaft 25. The lock arms 11a protrude from proper positions of the bearing cover 11 in a cantilever shape, and can appropriately flex by their own elasticity.

Upon assembling the panhead unit (the shaft 25 is already inserted) in the upper cover 12 as a base portion of the tilting mechanism, when the panhead unit is inserted into the upper cover 12 and the bearing cover 11 is simultaneously inserted (at two, right and left positions), the lock arms 11a temporarily ride over the lock portions 12c while appropriately and elastically deforming, engage with them, and press down the shaft 25. In this state, when the STM holder 26 is fixed to the upper cover 12 by screws, lock arm stoppers 26a formed in a recessed shape clamp the lock arms 11a. With this arrangement, even when an external load acts on the video camera 100 and panhead 2, the bearing cover 11 is never removed.

FIGS. 18 to 22 show the cable layout structure of the communication cables 5 and 6.

As such cables, a shield cable and a plug that has taken a measure against radio interferences must be used in consideration of safety against them. On the other hand, a cable must have high flexibility in consideration of its durability. The present invention can effectively solve these problems.

Figure 21:
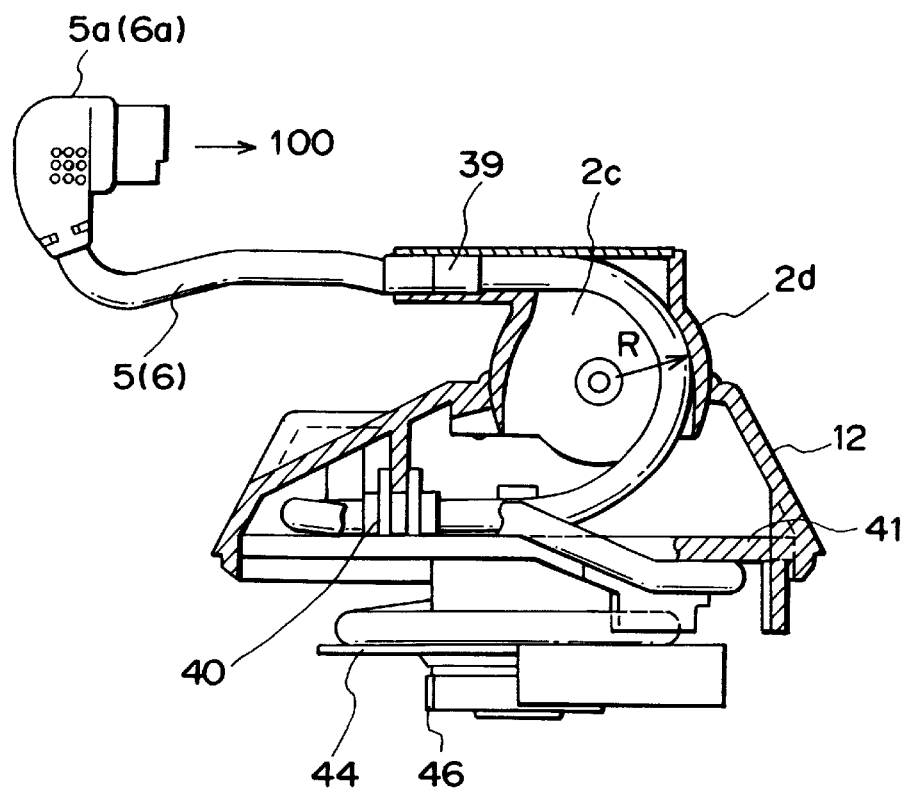
FIG. 21 is a sectional view showing the cable layout structure in the panhead device according to the embodiment of the present invention.

As shown in FIG. 21 and the like, as for, especially, radio interferences, by connecting the communication cables 5 and 6 to the video camera 100 via the interior of the panhead unit, the influences of the communication cables 5 and 6 on the connecting portions such as plugs during operation of the device can be removed.

On the other hand, as for durability, since the worm wheel 20 is disposed at the movable central portion of the panhead unit, an inner space 2c with a large R shape (curvature) is assured. For this reason, as shown in FIG. 21, the communication cables 5 and 6 can be laid out in an R shape along the inner space 2c without being forcibly bent, and the durability of the cables in the tilt portion can be improved. With this arrangement, since an outer wall portion 2d of the panhead 2 can be formed in an R shape, the gap between the upper cover 12 and the outer wall portion 2d can be uniformed upon tilting, thus assuring a good outer appearance.

The panhead 2 has a structure that allows the plugs 5a and 6a of the communication cables 5 and 6 to be inserted from the lower side of the panhead 2, since an opening portion 2e on the upper portion of the panhead 2 is formed to be larger than these plugs 5a and 6a. With this structure, the panhead 2 can be formed integrally, i.e., need not be formed by a plurality of parts. As a consequence, the mechanical strength and rigidity of the panhead 2 can be improved. The communication cables 5 and 6 are locked via bushes 39 and 40 respectively at the sides of the panhead 2 and upper cover 12. By attaching these bushes 39 and 40 at predetermined intervals along the communication cables 5 and 6, a cable unit can be appropriately built in the device without adjusting its length when these bushes 39 and 40 are inserted into bush guides provided to the panhead 2 and upper cover 12.

Figure 19:
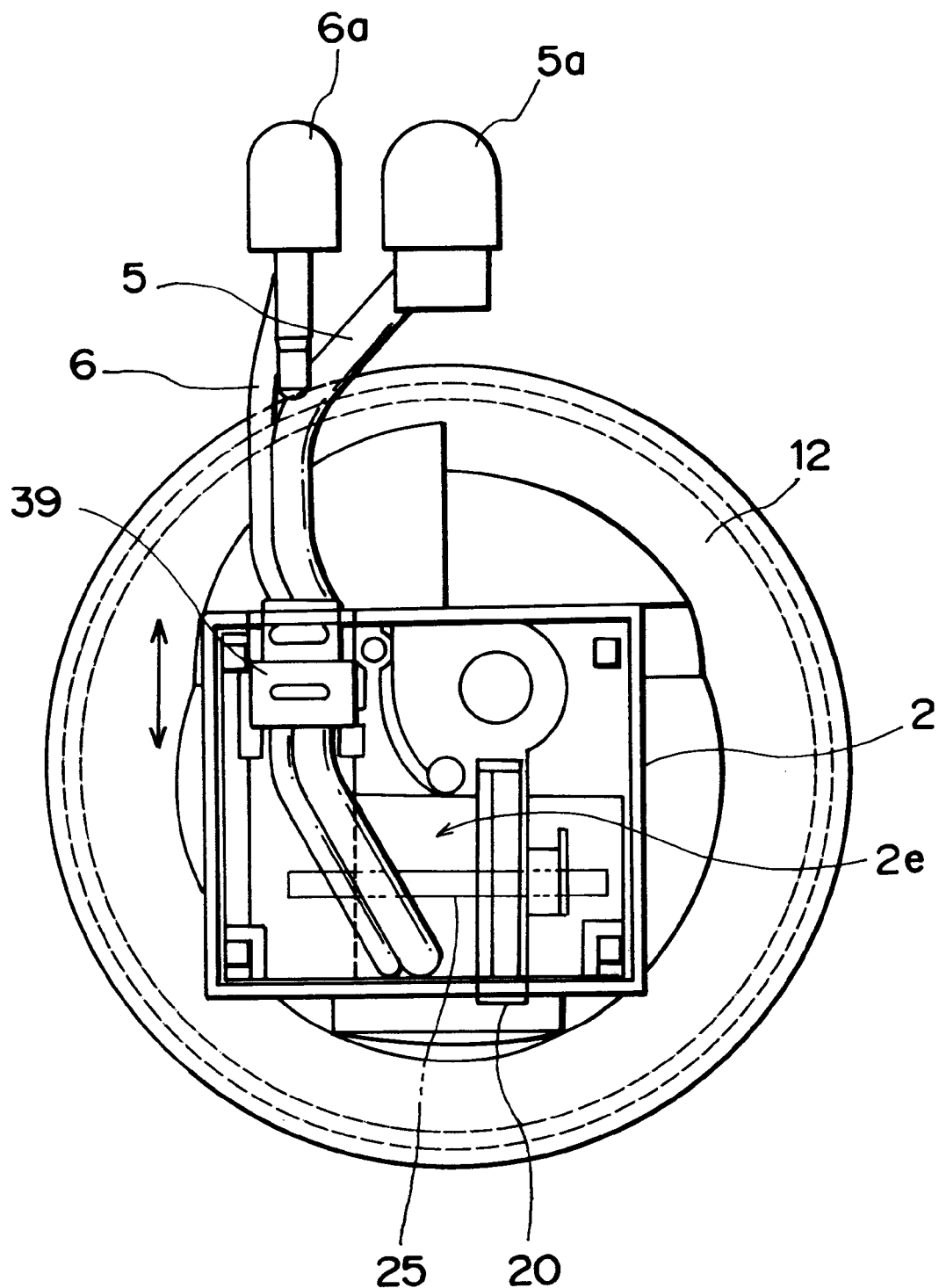
FIG. 19 is a plan view showing the cable layout structure in the panhead device according to the embodiment of the present invention.

When the communication cables 5 and 6 have a margin in the inner space 2c of the panhead 2 albeit slightly, a bush guide which is slidable in the direction of an arrow in FIG. 19 is set, and the bush 39 is slidably adjusted along the bush guide, thus absorbing any slack of the cable unit from the video camera 100.

The other bush 40 is inserted into the bush guide of the upper cover 12, and the cable unit is laid out. Thereafter, the upper cover 12 is covered by a flange 41 from its lower side (see FIG. 22), and the flange 41 is fixed at three positions using screws 42.

Figure 18:
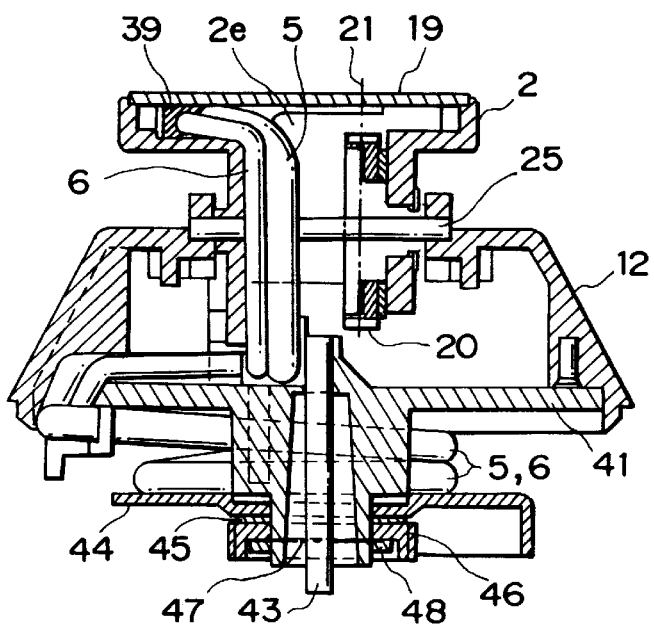
FIG. 18 is a sectional view showing the cable layout structure in the panhead device according to the embodiment of the present invention.
Figure 20:
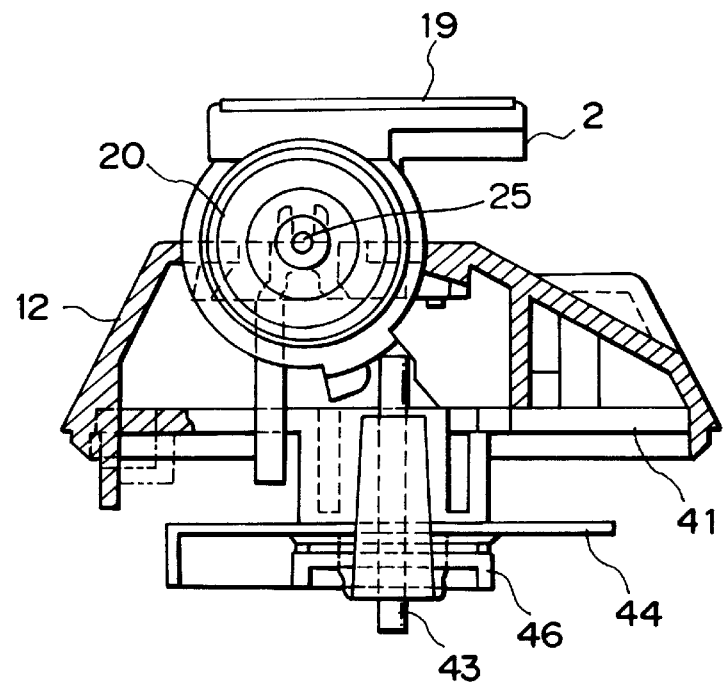
FIG. 20 is a sectional view showing the cable layout structure in the panhead device according to the embodiment of the present invention.

A shaft 43 is insert-molded at the center of the flange 41, and serves as a pivot center in the pan direction P (FIGS. 18 and 20). All the parts of the tilting mechanism are disposed above the flange 41, and the flange 41 has a flat bottom surface. Hence, a broad space that can effectively accommodate movements of the communication cables 5 and 6 upon pivoting in the pan direction P can be assured. A cable holder 44 for holding the communication cables 5 and 6 is disposed below the flange 41.

The cable holder 44 is fitted into the flange 41 at a fixed angle by a guide (not shown), and a friction plate 45, worm wheel 46, worm wheel spring 47, and grip ring 48 are inserted in turn into the lower side of the holder 44. The cable holder 44 is pressed against and fixed to the flange 41 by the elastic force of the worm wheel spring 47.

Figure 22:
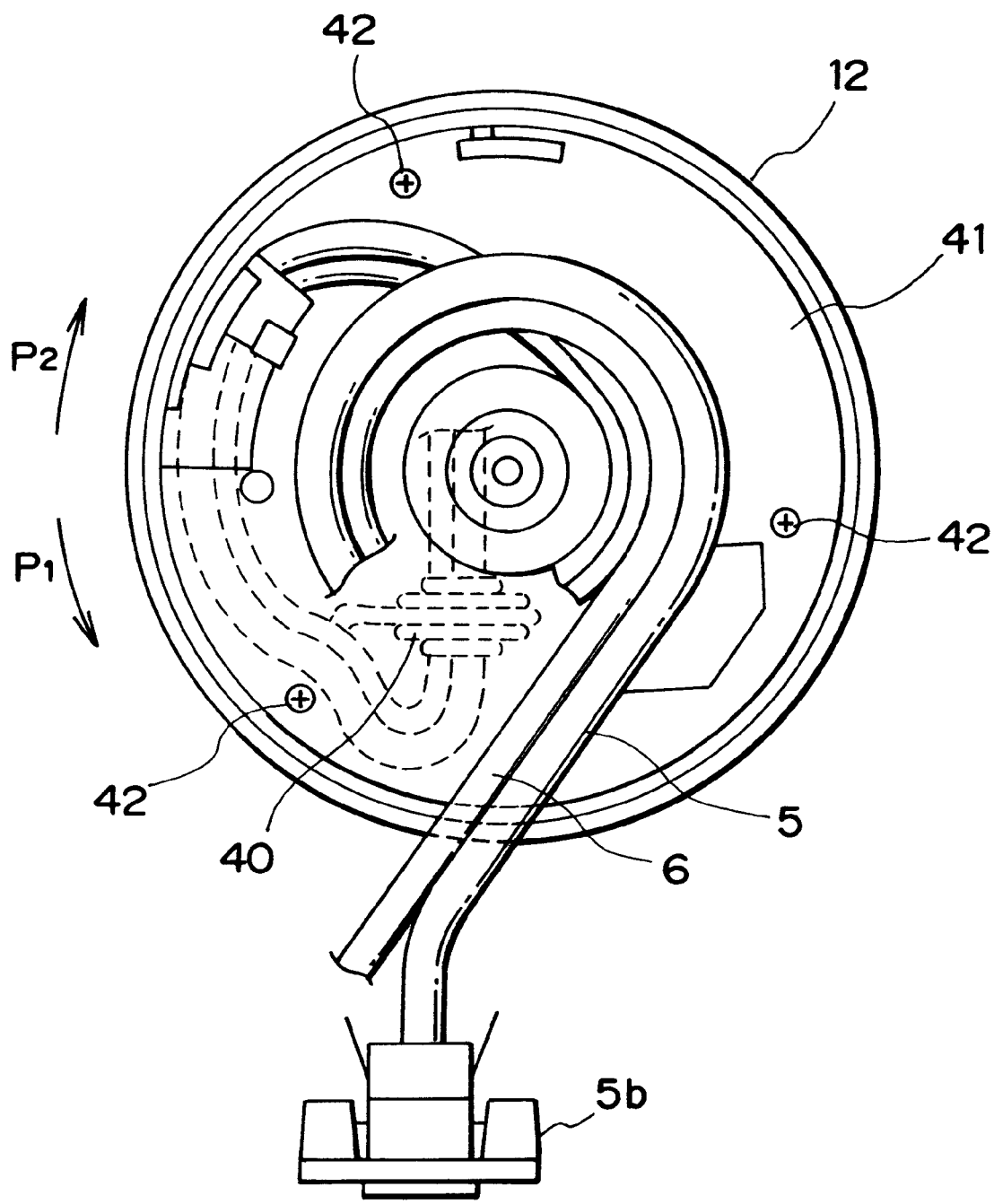
FIG. 22 is a bottom view showing the cable layout structure in the panhead device according to the embodiment of the present invention.
Figure 23:
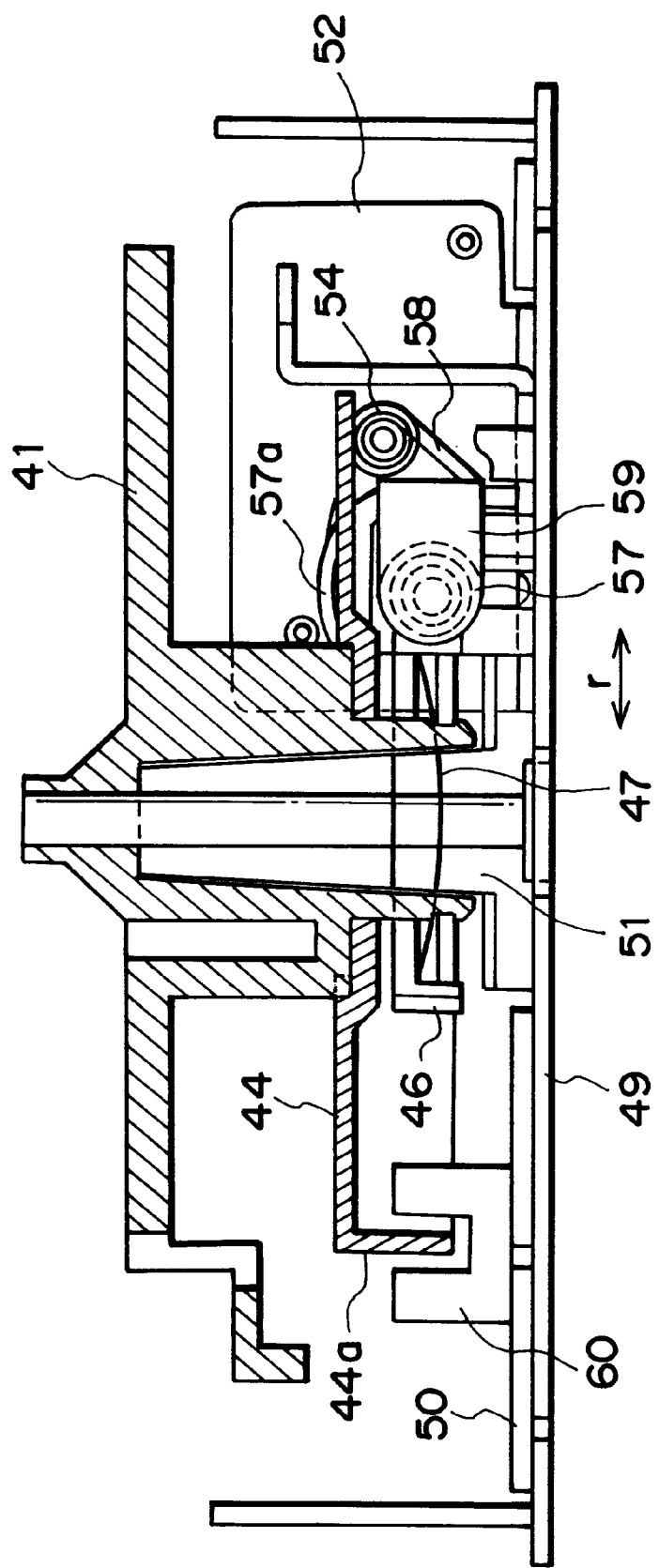
FIG. 23 is a sectional view showing the structure around a panning mechanism and device case in the panhead device according to the embodiment of the present invention.
Figure 24:
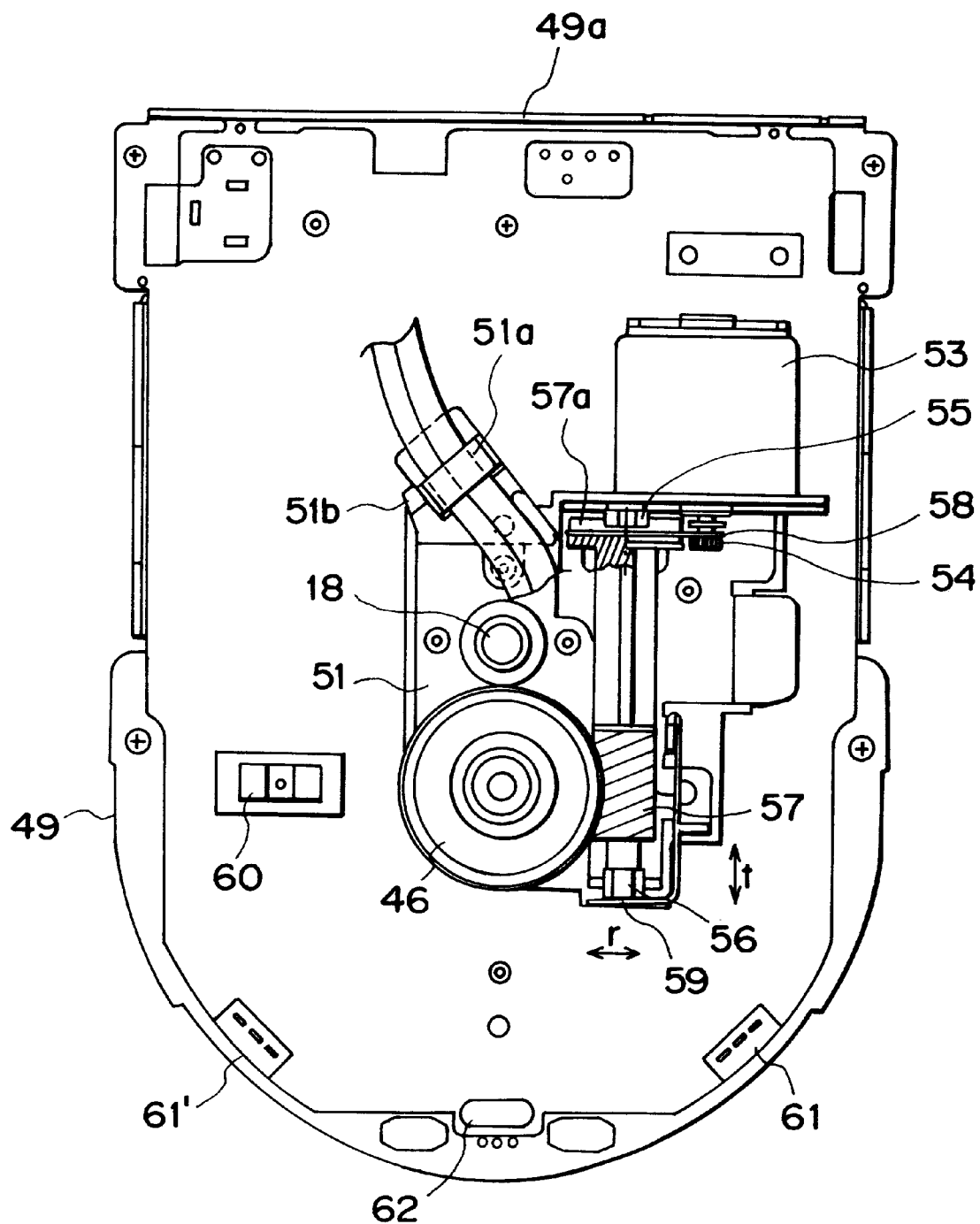
FIG. 24 is a plan view showing the structure around the panning mechanism and device case in the panhead device according to the embodiment of the present invention.

When the flange 41 and cable holder 44 have large areas, and their interval is preferably set at twice or more the cable diameter, the communication cables 5 and 6 can be disposed in two stages (two turns). In this manner, as shown in FIG. 22, the turn diameter of the communication cables 5 and 6 upon pivoting in a pan direction $P_1$ can be minimized and, hence, the panhead can pivot largely in a pan direction $P_2$. As described above, a large movable range of the cables can be assured within the limited space, and as a result, the pivot range in the pan direction P can be set at about ±90°.

FIGS. 23 to 26 show the structure around a panning mechanism and the case structure of the device.

The case of the device is constructed by a base 49 formed of an iron plate or the like. An insulating sheet and PCB unit 50 extend on the base 49. A rear portion 49a of the base 49 is bent in an L shape to also serve as a connector board for the plug 5a, socket 5b, power switch 8, or the like (see FIG. 5). A housing 51 for supporting the flange 41 and shaft 43 is fixed to the central portion of the base 49 by screws (not shown). On the housing 51, the camera screw 18, a cable clamp 51a, and a stopper 51b serving as a limiter for pan pivotal movement are integrally formed.

Figure 25:
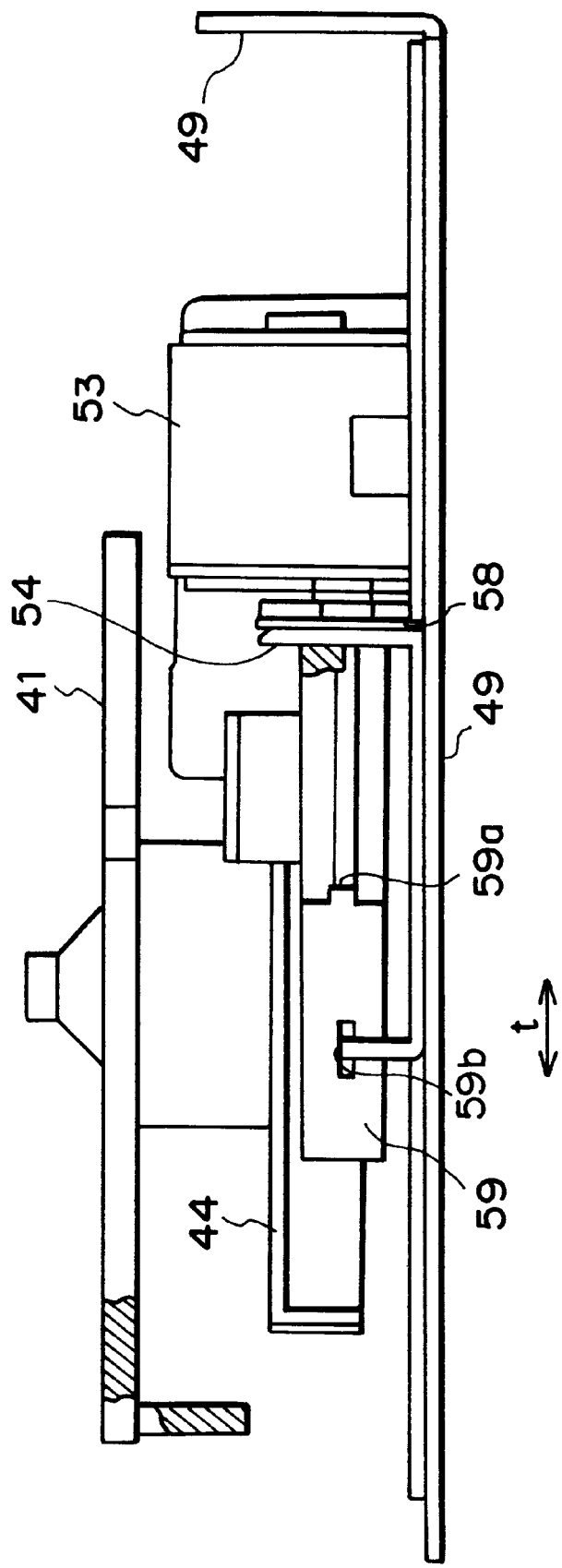
FIG. 25 is a sectional view showing the structure around the panning mechanism and device case in the panhead device according to the embodiment of the present invention.
Figure 26:
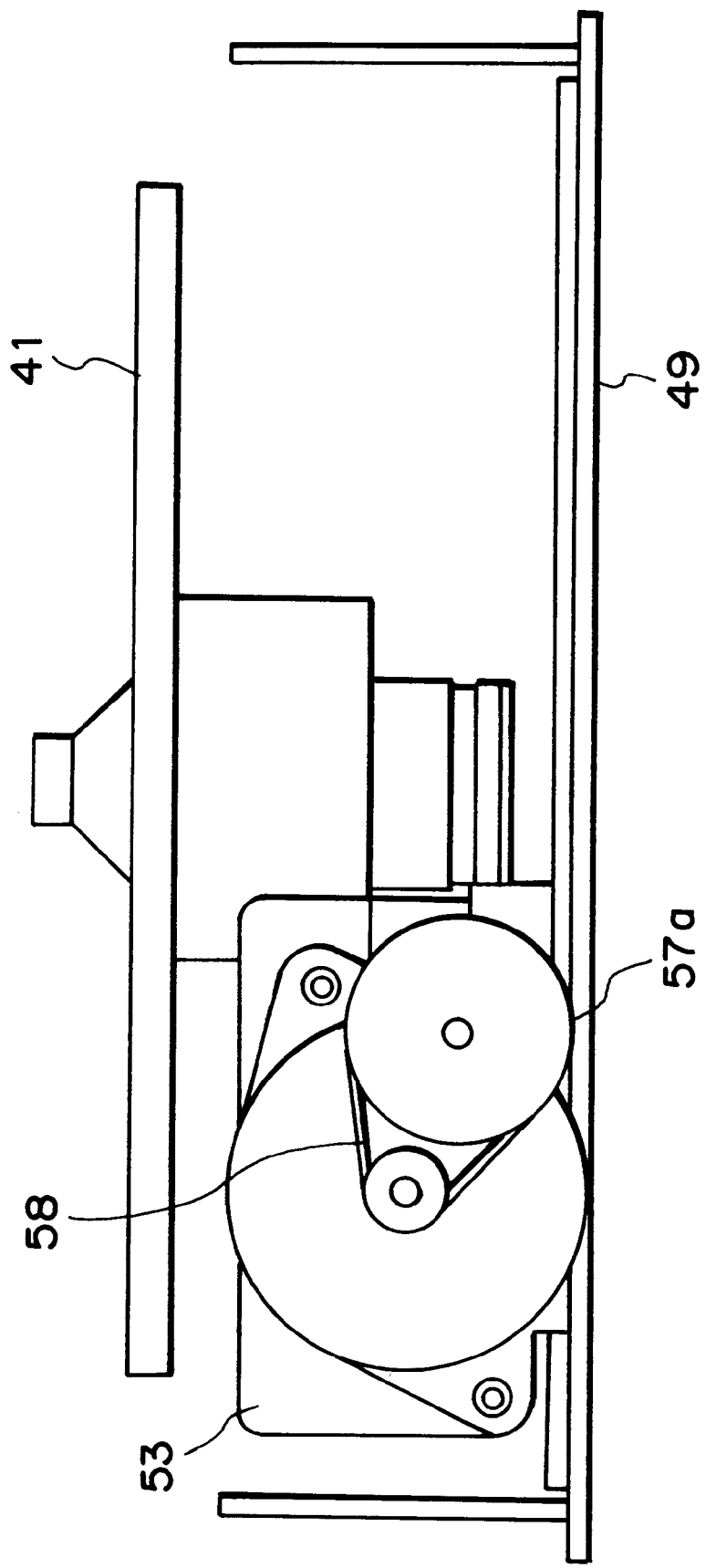
FIG. 26 is a sectional view showing the structure around the panning mechanism and device case in the panhead device according to the embodiment of the present invention.
Figure 27:
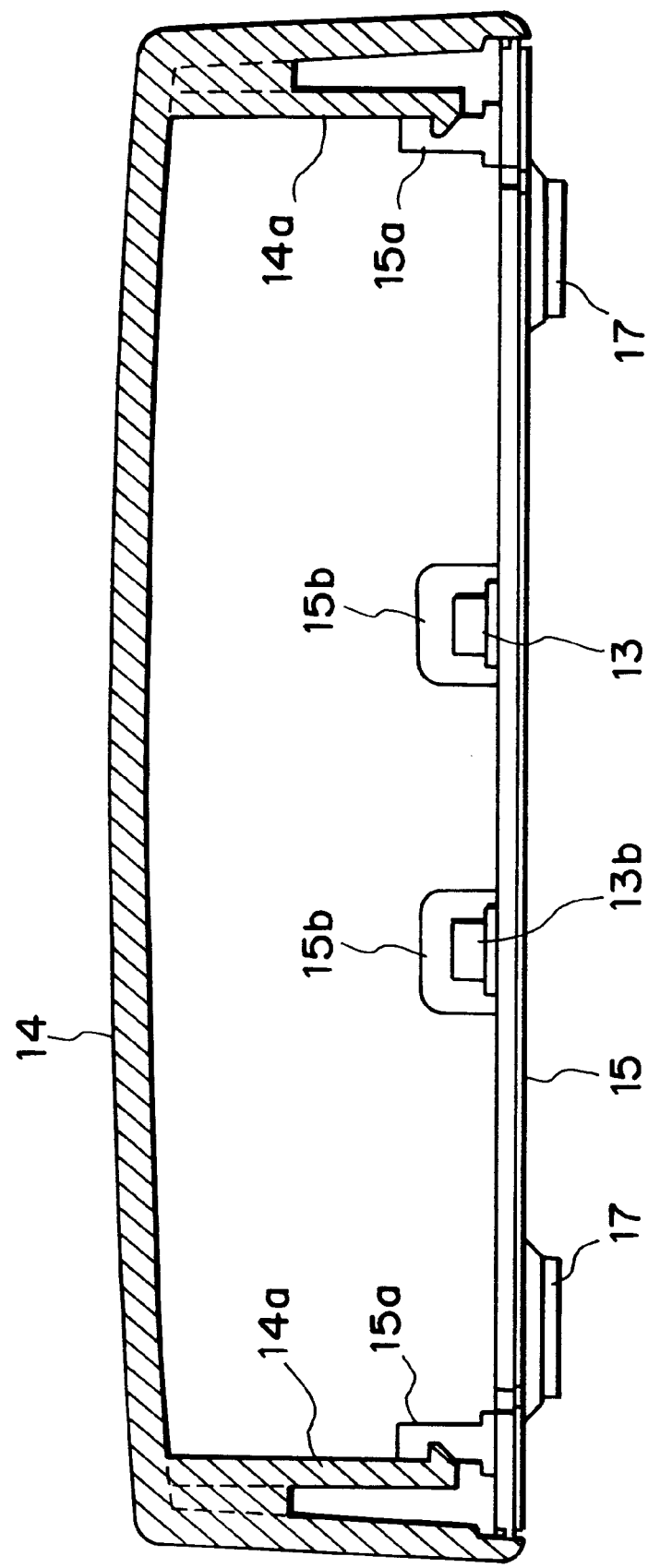
FIG. 27 is a sectional view showing an example of the arrangement of the exterior of the panhead device according to the embodiment of the present invention.

Reference numeral 52 denotes an STM holder, on which the entire panning mechanism is mounted. This portion has substantially the same basic structure as that of the tilt system and, hence, comprises a stepping motor 53, an STM gear 54 press-fitted onto the output shaft of the stepping motor 53, bearings 55 and 56, a worm 57 which is pivotally and axially supported by these bearings 55 and 56, a belt 58 for coupling the STM gear 54 and a belt hook portion 57a of the worm 57, and a leaf spring 59 for simultaneously pressing the worm 57 in the thrust and radial directions t and r. The leaf spring 59 is hooked and fixed at an appropriate position of the STM gear 54 by a lock portion 59a and is guided by the portion 59a and a portion 59b, as shown in FIG. 25.

Also, the structure around the above-mentioned worm wheel 46 is substantially the same as that of the tilt system. In this case, however, the flange 41 serves as a worm wheel shaft of the worm wheel 46.

A shielding portion 44a for a pan sensor 60 is integrally formed on the cable holder 44. The pan sensor 60 comprises a photocoupler mounted on the PCB unit 50, and an HP is recognized by shielding the optical path of this photocoupler. The HP detection mechanism has basically the same structure as that of the tilt system. That is, the shielding portion 44a is formed so that the pan sensor 60 is kept OFF when the flange 41 pivots from the HP in one direction, and is kept ON when the flange 41 pivots in the other direction.

Reference numerals 61 and 61' denote other light-receiving sensors, which receive a signal from a remote control unit (not shown) to control the driving of the panhead device 1. The operation state of the panhead device 1 can be indicated by an LED 62.

FIGS. 27 to 30 show an example of the arrangement of the device exterior.

Figure 28:
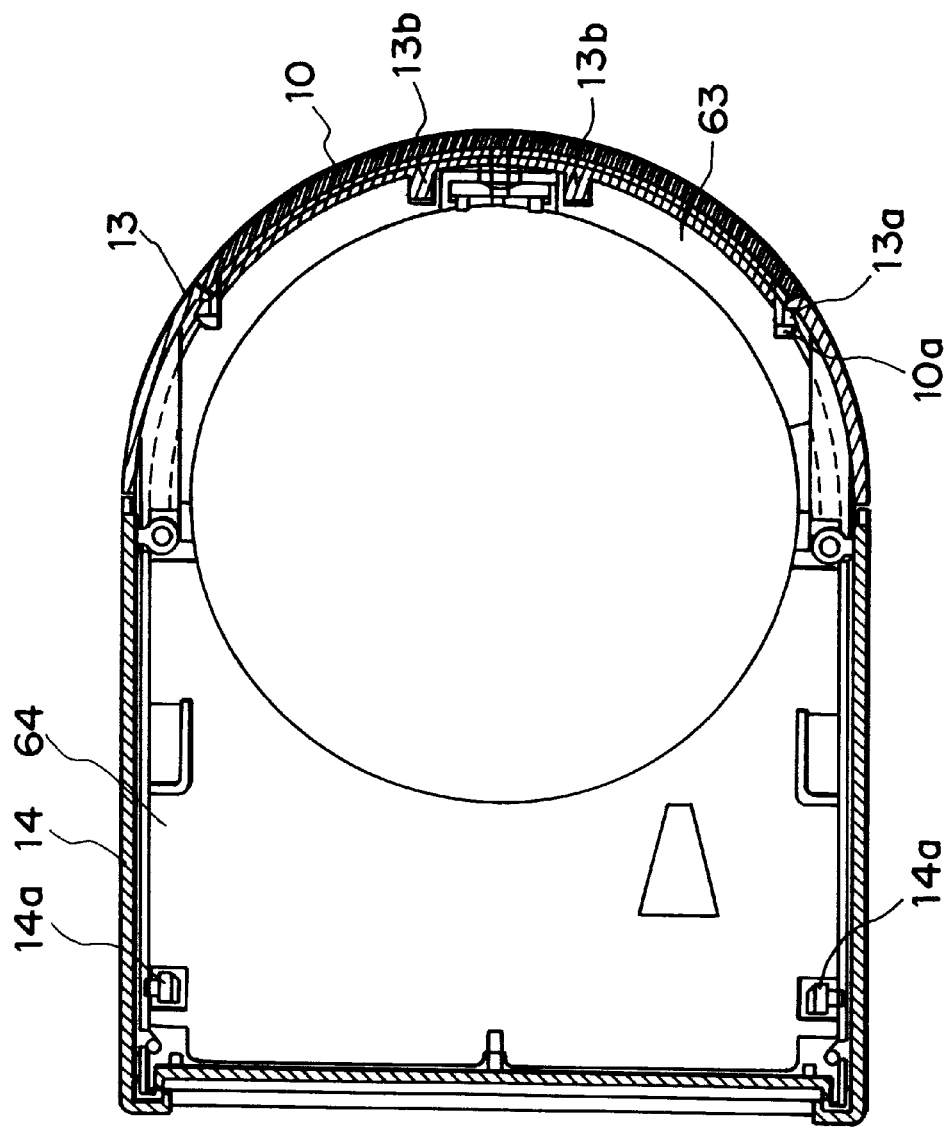
FIG. 28 is a plan view showing an example of the arrangement of the exterior of the panhead device according to the embodiment of the present invention.
Figure 29:
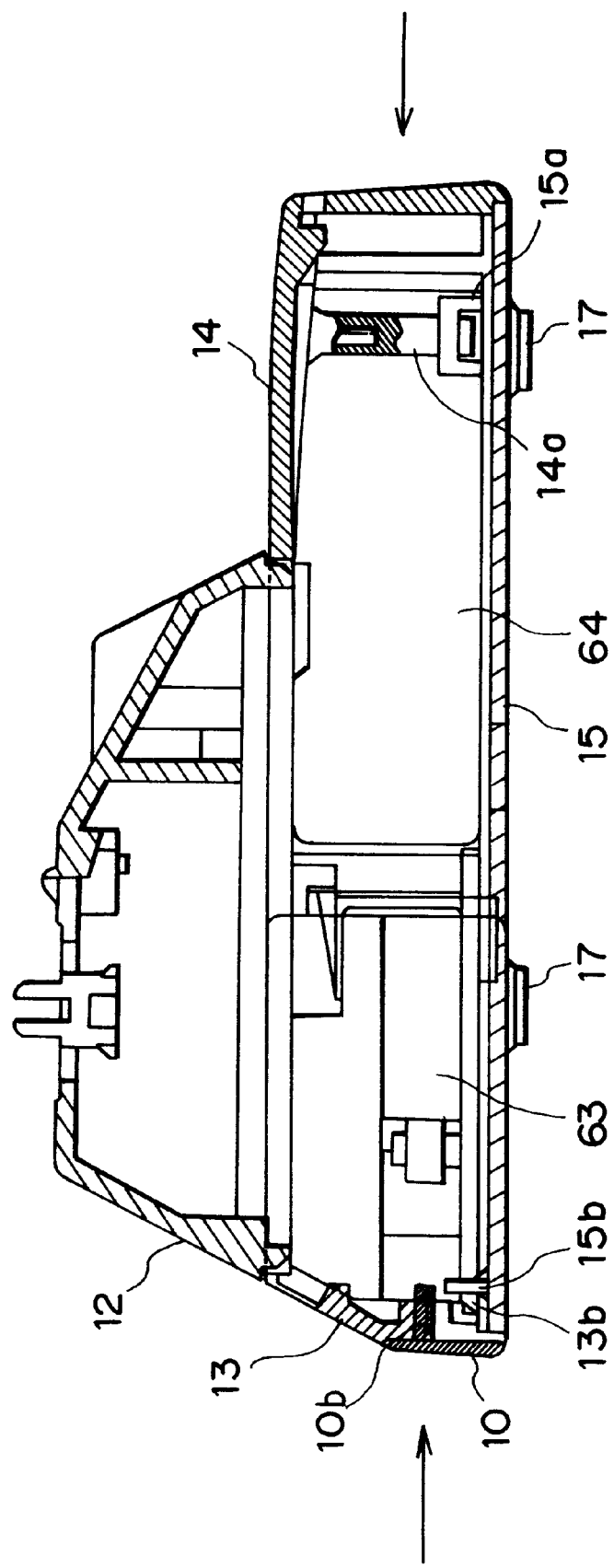
FIG. 29 is a sectional view showing an example of the arrangement of the exterior of the panhead device according to the embodiment of the present invention.
Figure 30:
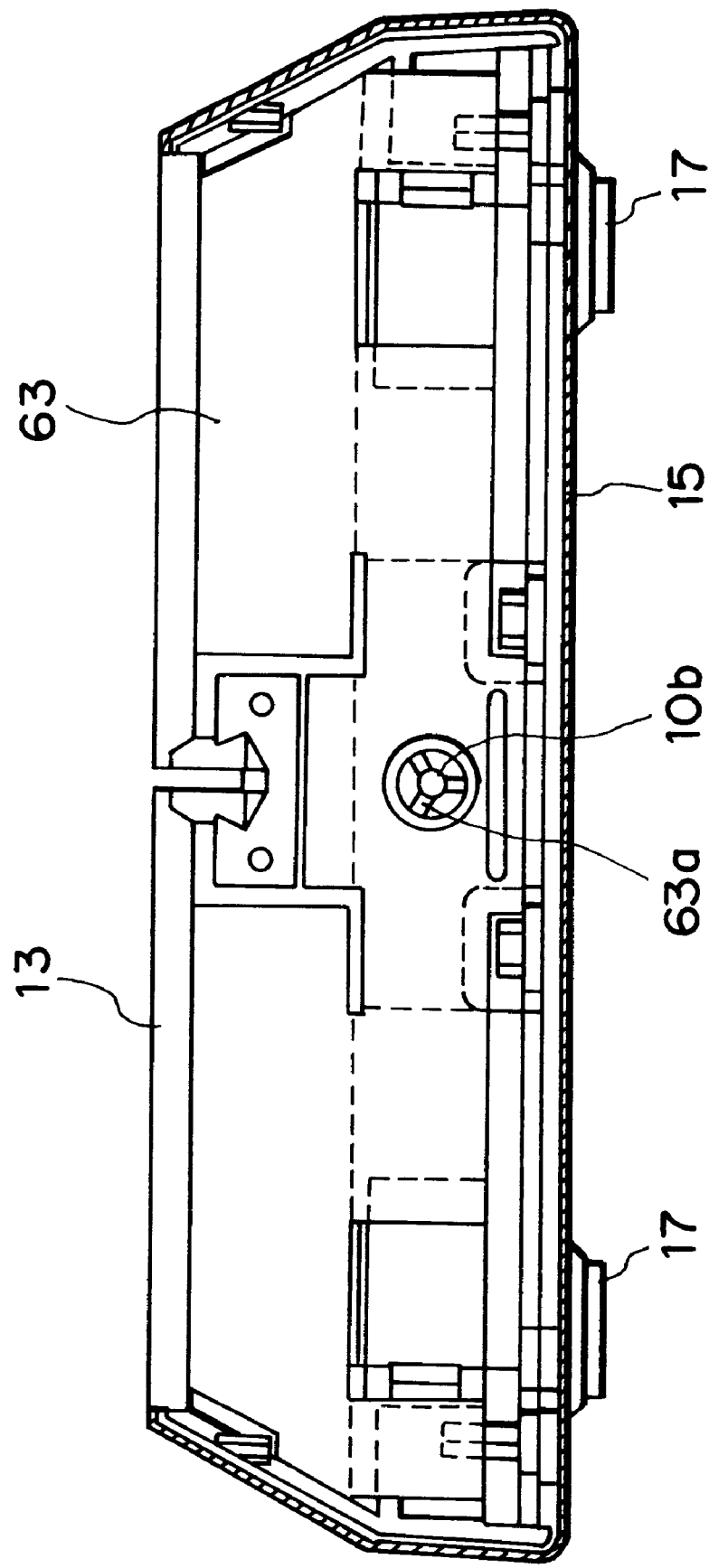
FIG. 30 is a sectional view showing an example of the arrangement of the exterior of the panhead device according to the embodiment of the present invention.

As shown in FIG. 28, a device exterior cover includes front and rear cover units. The front cover unit is made up of the nearly U-shaped front cover 13, the light-receiving cover 10 fitted into the front cover 13, and a front shield 63 consisting of a thin metal plate. The light-receiving cover 10 consists of an acrylic resin material that can transmit infrared rays emitted by a remote control unit. A lock arm pawl 10a of the cover 10 is locked by a lock portion 13a of the front cover 13, and its boss 10b is fixed by a lock pawl 63a of the front shield 63.

The rear cover unit is built by press-fitting a rear shield 64 consisting of a thin metal plate into the rear cover 14. The bottom cover 15 to which the four rubber legs 17 are adhered is attached to the bottom surface of the rear cover unit.

The front and rear cover units are inserted inside the upper cover 12 by sliding them. When the rear cover 14 is inserted first, and the bottom cover 15 is then inserted from the bottom surface side, a lock arm 14a of the rear cover 14, and a lock pawl 15a of the bottom cover 15 engage with each other and are locked. Although the base 49 is not shown, it is clamped between these covers. Thereafter, when the front cover unit is inserted from the front side, and a lock arm 13b of the front cover 13 extends through a lock pawl 15b of the bottom cover 15, the front and bottom covers 13 and 15 are fixed. Finally, the rear cover 14 is fixed by the screws 16 from the bottom side of the bottom cover 15 via the bottom cover 15, front cover 13, and base 49, thus fixing the exterior cover.

The arrangements of the respective portions of the panhead device 1 have been described in detail. Furthermore, in the overall arrangement of the device, especially, the pivot center of the tilt system is set to be offset to the front side of that of the pan system. Since the offset layout of the two pivot axes (the shafts 25 and 43) is adopted, the field of view below the horizontal line upon tilting can be assured, and the video camera 100 can be prevented from interfering with the upper cover 12.

On the other hand, since the tilt system is offset forward, a spatial margin is assured behind the upper cover 12, and the stepping motor 28 can be properly stored in a recessed portion 12d (see FIG. 10) of this portion. With this arrangement, the entire tilting mechanism can be housed inside a small conical portion of the upper cover 12, and the flange 41 can be prevented from bulging from the bottom surface. Hence, the panning and tilting mechanisms can be prevented from interfering with each other in the horizontal direction, and a broad pan angle range can be assured. Also, since the storage space of the communication cables 5 and 6 can be effectively used, large panning can be done within a limited range, thus effectively realizing a compact, low-profile structure of the entire device at the same time.

In the driving control of the panhead device 1 of this embodiment, as shown in FIG. 31, a pan or tilt driving control signal is input to the system controller via the communication cables 5 and 6. Note that the control signal may be input to the light-receiving sensors 61 and 61' using a remote control unit. In this case, when the power switch of the device is turned on, the HP in the pan direction P or tilt direction T can be detected by the tilt sensor 35 and pan sensor 60.

As described above, the tilt sensor 35 and pan sensor 60 generate ON or OFF signals in correspondence with the current positions of the tilt and pan units with respect to the HPs upon powering the device, and the system controller determines the current position based on these signals. When the individual units are to be controlled to return to the HPs, the tilt or pan unit can be driven in a predetermined direction on the basis of the determined current position. When the tilt or pan unit has reached the HP, the output signal from the tilt sensor 35 or pan sensor 60 changes to ON or OFF, thus detecting the arrival at the HP.

In the above-mentioned panhead device 1, the shaft 25 serving as a horizontal tilt pivot shaft is disposed in front of the shaft 43 serving as a pan pivot shaft standing upright on the base 49 of the device. With this arrangement, the principal constituting members (the stepping motor 28 and the like) can be disposed in a compact space behind the tilt pivot shaft. Since a compact, low-profile device can be realized consequently, the downward tilt range of the video camera 100 on the panhead 2 can be broadened. Also, interferences between the video camera 100 and the upper cover 12 can be prevented.

In the panhead device 1, when the tilting driving force of the tilting mechanism is transmitted, the driving force of the stepping motor 28 is transmitted via the worm 30 and the worm wheel 20 that meshes with the worm 30. Upon transmitting the driving force, the leaf spring 33 that elastically contacts the end portion of the worm 30 biases the worm 30 not only in the thrust direction t but also in the radial direction r. In this manner, since the single leaf spring 33 biases the worm 30 in both the thrust and radial directions t and r, cluttering between the worm 30 and worm wheel 20 can be removed by a simple arrangement, and the driving force can be smoothly transmitted.

In addition, in this case, the tilt angle of the leaf spring 33 is preferably set, so that the partial force in the thrust direction t becomes properly larger than that in the radial direction r. In this manner, high power transmission efficiency can be obtained without any cost of the driving force of the stepping motor 28. As a result, noise upon operating the tilting mechanism can be reduced, and stop position precision in the tilt direction can be improved. Upon assembling the members such as the worm 30, worm wheel 20, and the like, since the spring 33 appropriately and elastically biases them, these members can be assembled without requiring any cumbersome attachment position adjustments, thus attaining easy assembly.

These effects are expected not only in the tilting mechanism but also in the panning mechanism. That is, in the panning mechanism as well, smooth driving force transmission and high position precision can be assured.

Furthermore, in the arrangement especially around the bearing cover 11, since the bearing cover 11 is inserted from the upper side of the upper cover 12 upon assembling the panhead unit, the lock arms 11a can be clamped, thus properly fixing the shaft 25. In this manner, the panhead unit can be adequately assembled by simple operation, i.e., by only inserting the bearing cover 11 into the upper cover 12, and a high coupling strength against an external force can be assured. Hence, operability upon assembling the panhead unit can be improved, and a highly reliable coupling structure can be realized.

Moreover, the communication cables 5 and 6 can be optimally laid out along the curved inner wall that define the inner space 2c of the panhead unit to have an appropriate curvature. As described above, since the communication cables 5 and 6 are laid out in the inner space 2c that stores the worm wheel 20, the durability of the communication cables 5 and 6 themselves can be improved, and the device can operate smoothly.

In the panhead device 1, since the tilt sensor 35 and pan sensor 60 serving as HP sensors are combined with the shielding plate 36 and shielding portion 44a as pivot members which synchronously pivot about the tilt and pan central axes (shafts 24 and 43) to have predetermined layout relationships therebetween, the panhead can be quickly returned to the HP by the system controller upon powering, and panning and tilting can be done efficiently.

In this case, further, the system controller controls driving to do automatic tilting or panning from the current position in the direction of the HP on the basis of the direction of the HP detected by the HP sensors. The system controller monitors the HP all the time by detecting if the output signal from the HP sensor in the tilt or pan unit changes to ON or OFF.

Upon monitoring the HP, a predetermined angle range on the two sides of the HP (preferably, about ±10°) is pre-set in the system controller as an HP allowable range. When the current position of the tilt or pan unit falls outside this range, the system controller generates an HP error signal. In this embodiment, by monitoring the HP within a range in which the panhead is ordinarily frequently used, even when the photographer touches the video camera 100 during photographing and the panhead device 1 goes out-of-control, the HP monitoring function can quickly reset the device.

In this embodiment, photosensors such as photocouplers are used as the HP sensors. Alternatively, the HP sensors may comprise magnetic sensors. That is, a pivot member corresponding to the shielding plate 36 or shielding portion 44a that synchronously pivots about the tilt or pan central axis is magnetized in n and s poles. That is, one side of the pivot member corresponding to one side of the HP upon panning or tilting is magnetized in an n pole, and the other side of the pivot member corresponding to the other side of the HP is magnetized in an s pole, thereby generating different magnetic signals on the two sides of the HP. Even when the magnetic sensors are used in this manner, the system controller can accurately detect the HP.

As described above, according to the present invention, a compact panhead device which has a structure that allows easy assembly, and has high operation performance can be provided.

As many apparently widely different embodiments of the present invention can be made without departing from the spirit and scope thereof, it is to be understood that the invention is not limited to the specific embodiments thereof except as defined in the appended claims.

What is claimed is:

1. A camera device which has an image sensing device supported on a panhead pivoting the image sensing device in a pan or tilt direction, comprising:

a tilt mechanism tilting said panhead about a tilt pivot shaft;

a pan mechanism panning said tilt mechanism about a pan pivot shaft; and a tilt driving unit which includes a motor and drives said tilt mechanism by the motor, wherein the motor included in said tilt driving unit is disposed behind said tilt mechanism, and pan pivot shaft stands upright on a base of said camera device, and said tilt pivot shaft is horizontally disposed above and to be offset in front of said pan pivot shaft in a back-and-forth direction of said camera device, thereby said tilt mechanism is disposed above and to be offset in front of said pan mechanism in the back-and-forth direction.

2. The device according to claim 1, wherein each of said tilt and pan mechanisms includes power transmission means having a worm and worm wheel, and said worm is biased in a radial direction of said worm wheel so as to remove cluttering between said worm and worm wheel.

3. The device according to claim 2, wherein said worm is biased by at least a leaf spring which elastically contacts said worm in the thrust direction thereof.

4. The device according to claim 3, wherein said leaf spring is disposed to have a tilt so as to produce partial forces in a radial direction of said worm wheel and in the thrust direction of said worm.

5. The device according to claim 4, wherein said leaf spring produces the larger partial force in the thrust direction than the partial force in the radial direction.

6. The device according to claim 1, wherein said panhead and a bearing cover that fixes said tilt pivot shaft are assembled from an upper side with respect to said base of said tilt mechanism, and said panhead is fixed to and supported on said base of said tilt mechanism when said bearing cover is assembled.

7. The device according to claim 6, wherein said bearing cover has a lock arm that engages with a predetermined position of said base, and said lock arm clamps to said predetermined position of said base.

8. The device according to claim 7, wherein said lock arm protrudes from a predetermined position of said bearing cover and elastically engages with said base.

9. The device according to claim 1, wherein said panhead pivots about said tilt pivot shaft, and a communication cable is mounted inside said panhead.

10. The device according to claim 9, wherein said communication cable is mounted along a curved wall surface inside said panhead.

11. The device according to claim 10, wherein one end of said communication cable directly extends from said panhead to said camera device.

12. The device according to claim 10, wherein a worm wheel which pivots about said tilt pivot shaft is mounted inside said panhead.

13. The device according to claim 1, further comprising:

detection means for detecting a home position for panning or tilting of said panhead, wherein a device of said detection means outputs a first predetermined signal when said panhead is located within an operation range on one side of a reference position for said panhead, and outputs a second predetermined signal when said panhead is located within an operation range on the other side of the reference position.

14. The device according to claim 13, wherein, said device of said detection means comprises:

a pivot member which synchronously pivots about an axis coaxial with a central axis for the panning or tilting, and a sensor for outputting the first or second predetermined signal, wherein a state of an output signal from said sensor is changed by said pivot member.

15. The device according to claim 14 wherein the state of the output signal from said sensor changes when said panhead is located at a home position for panning or tilting.

16. A camera device which has an image sensing device supported on a panhead pivoting the image sensing device in a pan or tilt direction, comprising:

driving force transmission systems for respectively panning and tilting said panhead, wherein each of said driving force transmission systems includes power transmission means having a worm and worm wheel, and a leaf spring that contacts the end portion of said worm and biases said worm in both a thrust direction of said worm and a radial direction of said worm wheel.

17. The device according to claim 16, wherein said leaf spring elastically contacts said worm in the thrust direction thereof.

18. The device according to claim 16, wherein said leaf spring tilts to produce partial forces in a radial direction for said worm wheel.

19. The device according to claim 18, wherein said leaf spring produces a larger partial force in the thrust direction than the radial direction.

20. The device according to claim 16, further comprising:

a friction plate inserted between said worm wheel and said panhead; and a worm wheel spring pressing said worm wheel to said panhead side, wherein a friction clutch, which slips when a predetermined external pressure force acts on said image sensing device, is formed by said friction plate and said worm wheel spring.

* * * * *

UNITED STATES PATENT AND TRADEMARK OFFICE
CERTIFICATE OF CORRECTION

PATENT NO.    : 6,203,216 B1
DATED         : March 20, 2001
INVENTOR(S)   : Koizumi It is certified that error appears in the above-identified patent and that said Letters Patent is hereby corrected as shown below:

<u>Column 1,</u>
Line 26, delete "lower" and insert therefor -- power --

Signed and Sealed this

Sixth Day of August, 2002

Attest:

Attesting Officer

JAMES E. ROGAN
*Director of the United States Patent and Trademark Office*